US011388315B2

(12) United States Patent
Hanamoto et al.

(10) Patent No.: US 11,388,315 B2
(45) Date of Patent: Jul. 12, 2022

(54) APPARATUS OF SYNCHRONIZING A VIDEO SYNCHRONIZING SIGNAL WITH ANOTHER SIGNAL AND METHOD OF CONTROLLING THE APPARATUS

(71) Applicant: CANON KABUSHIKI KAISHA, Tokyo (JP)

(72) Inventors: Nobuyuki Hanamoto, Kanagawa (JP);
Takashi Tokoro, Kanagawa (JP);
Takushi Kimura, Kanagawa (JP);
Noriaki Suzuki, Kanagawa (JP);
Yasuhito Kigure, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/331,065

(22) Filed: May 26, 2021

(65) Prior Publication Data
US 2021/0377424 A1  Dec. 2, 2021

(30) Foreign Application Priority Data
May 29, 2020 (JP) .............................. JP2020-094911

(51) Int. Cl.
*H04N 5/073* (2006.01)
(52) U.S. Cl.
CPC ................................. *H04N 5/0733* (2013.01)
(58) Field of Classification Search
CPC ....... H04N 5/0733; H04N 5/06; H04L 7/0016
See application file for complete search history.

(56) References Cited

U.S. PATENT DOCUMENTS

| 7,333,149 B2* | 2/2008 | Choi ........................ H04N 7/01 |
| | | 348/E7.003 |
| 7,796,194 B2* | 9/2010 | Hall ..................... H04N 7/0102 |
| | | 348/558 |
| 9,003,061 B2* | 4/2015 | Smith .................... G09G 5/005 |
| | | 709/246 |
| 9,402,092 B2* | 7/2016 | Morotomi .......... H04N 21/8547 |
| 9,591,283 B2* | 3/2017 | Ihara .................... H04N 21/854 |
| 9,948,940 B2* | 4/2018 | Ihara .................. H04N 21/8586 |
| 10,034,035 B2* | 7/2018 | Eber .................. H04N 21/4307 |
| 10,097,790 B2* | 10/2018 | Strein ...................... H04L 69/28 |
| 10,135,601 B1* | 11/2018 | Beardsley ............. H04L 65/604 |
| 10,425,217 B2* | 9/2019 | Ooishi ..................... H04B 1/16 |

(Continued)

FOREIGN PATENT DOCUMENTS

JP  2004304809 A  10/2004
JP  2007096589 A  4/2007
(Continued)

*Primary Examiner* — Brian P Yenke
(74) *Attorney, Agent, or Firm* — Canon U.S.A., Inc. IP Division

(57) ABSTRACT

An apparatus includes a generating unit and a transmitting unit. The generating unit generates synchronization format information regarding a vertical synchronizing frequency and a horizontal synchronizing frequency of a first video synchronizing signal, and generates phase difference information indicating a phase difference between the first video synchronizing signal and a first reference signal synchronized with a grand master clock. The transmitting unit transmits the synchronization format information and the phase difference information to an external apparatus that can generates a second video synchronizing signal synchronized with the first video synchronizing signal.

15 Claims, 18 Drawing Sheets

(56) References Cited

U.S. PATENT DOCUMENTS

| | | | |
|---|---|---|---|
| 10,523,558 B2* | 12/2019 | Berry | H04N 21/4382 |
| 10,595,075 B2* | 3/2020 | Beardsley | H04L 65/80 |
| 10,750,228 B2* | 8/2020 | Fankhauser | H04N 21/434 |
| 2004/0257469 A1 | 12/2004 | Compton et al. | |
| 2005/0156869 A1* | 7/2005 | Mori | H04N 5/44 |
| | | | 345/104 |
| 2007/0086487 A1 | 4/2007 | Yasuda et al. | |
| 2011/0228834 A1* | 9/2011 | Umayabashi | H03L 7/08 |
| | | | 375/224 |
| 2012/0086814 A1* | 4/2012 | Tsubaki | H04N 21/4305 |
| | | | 348/192 |
| 2012/0092443 A1* | 4/2012 | Mauchly | H04N 21/64753 |
| | | | 348/E7.083 |
| 2013/0038648 A1* | 2/2013 | Kasahara | B41J 3/407 |
| | | | 347/2 |
| 2014/0307168 A1* | 10/2014 | Law | H04N 5/04 |
| | | | 348/500 |
| 2015/0116594 A1* | 4/2015 | Chuang | H04N 21/4305 |
| | | | 348/495 |
| 2018/0288424 A1* | 10/2018 | LaBosco | H04L 65/608 |
| 2019/0221186 A1* | 7/2019 | Jang | H04N 5/06 |
| 2020/0021296 A1* | 1/2020 | Spijker | H04L 7/0331 |
| 2021/0176379 A1* | 6/2021 | Shin | H04N 5/23206 |
| 2021/0281805 A1* | 9/2021 | Nakatani | H04N 5/04 |
| 2022/0004351 A1* | 1/2022 | Padmanabhan | G06F 3/1446 |

FOREIGN PATENT DOCUMENTS

| | | | |
|---|---|---|---|
| JP | 2007267421 A | 10/2007 | |
| JP | 4528010 B2 | 8/2010 | |
| JP | 2011061843 A | 3/2011 | |
| JP | 4914933 B2 | 4/2012 | |

* cited by examiner

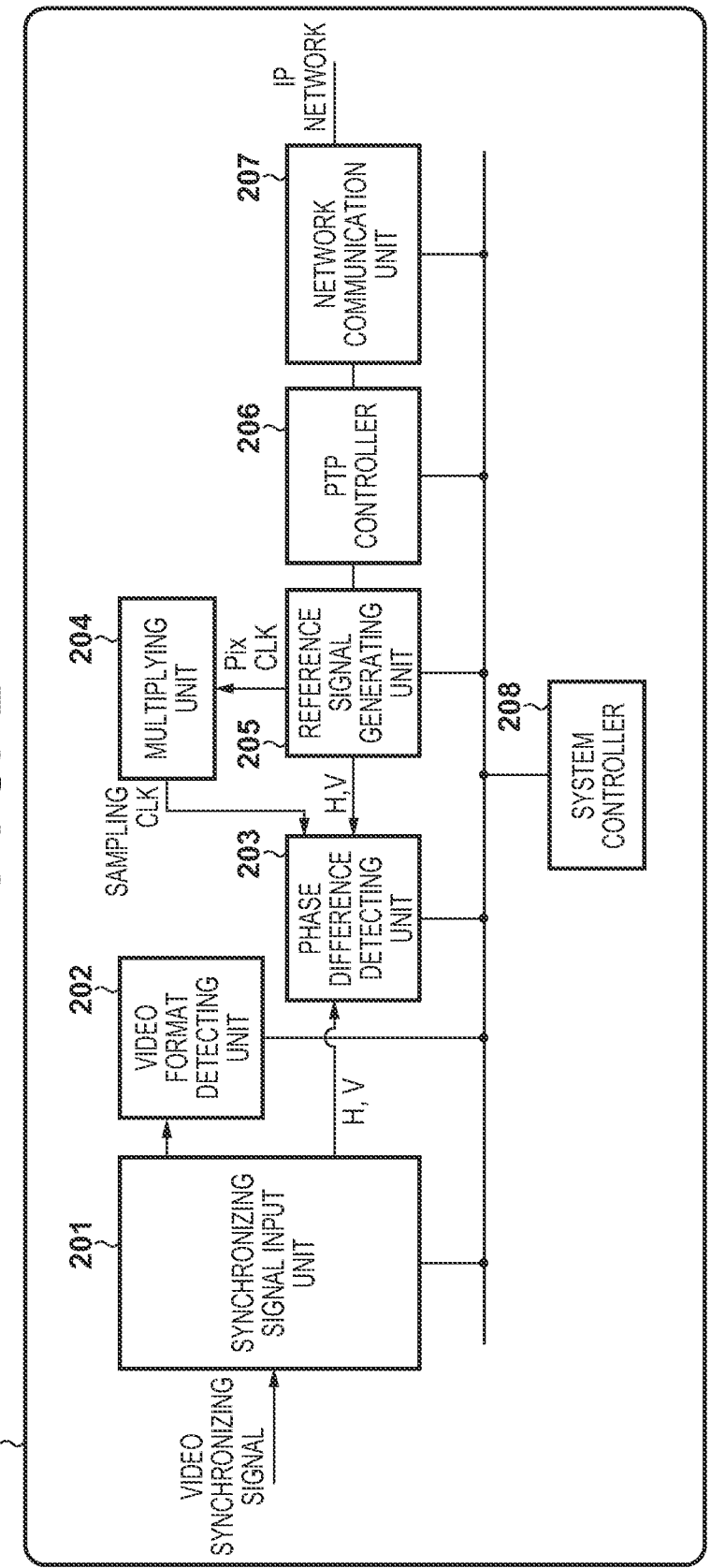

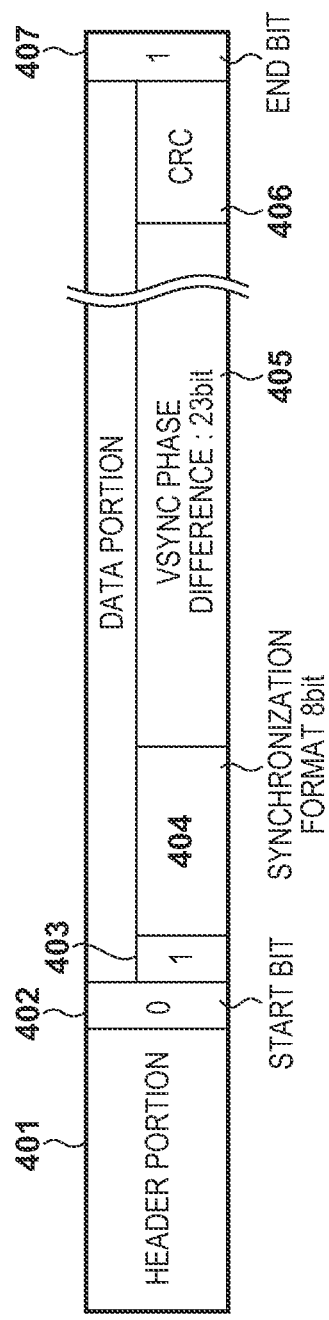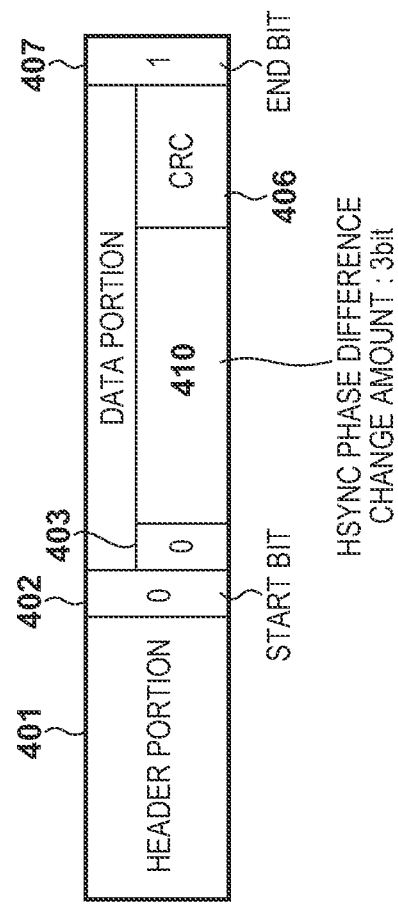

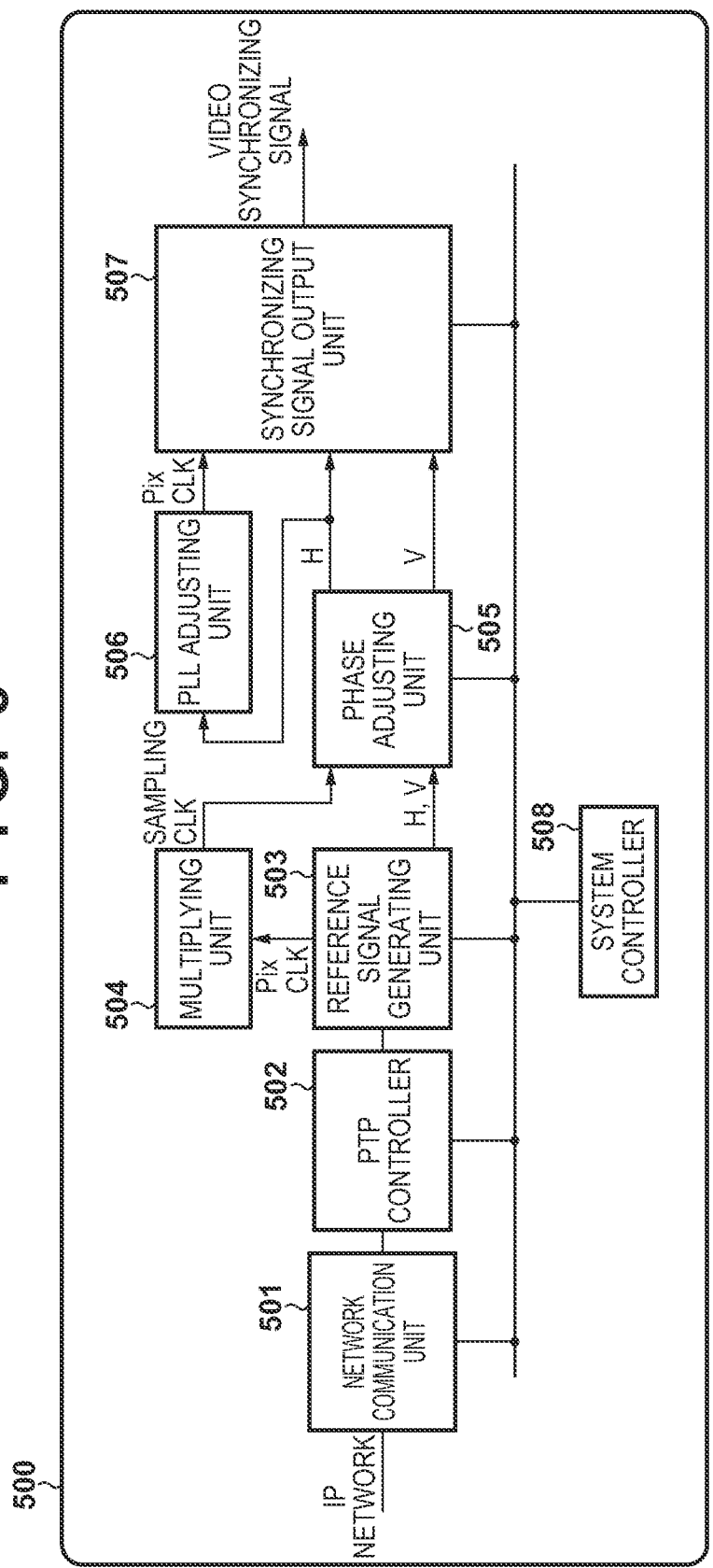

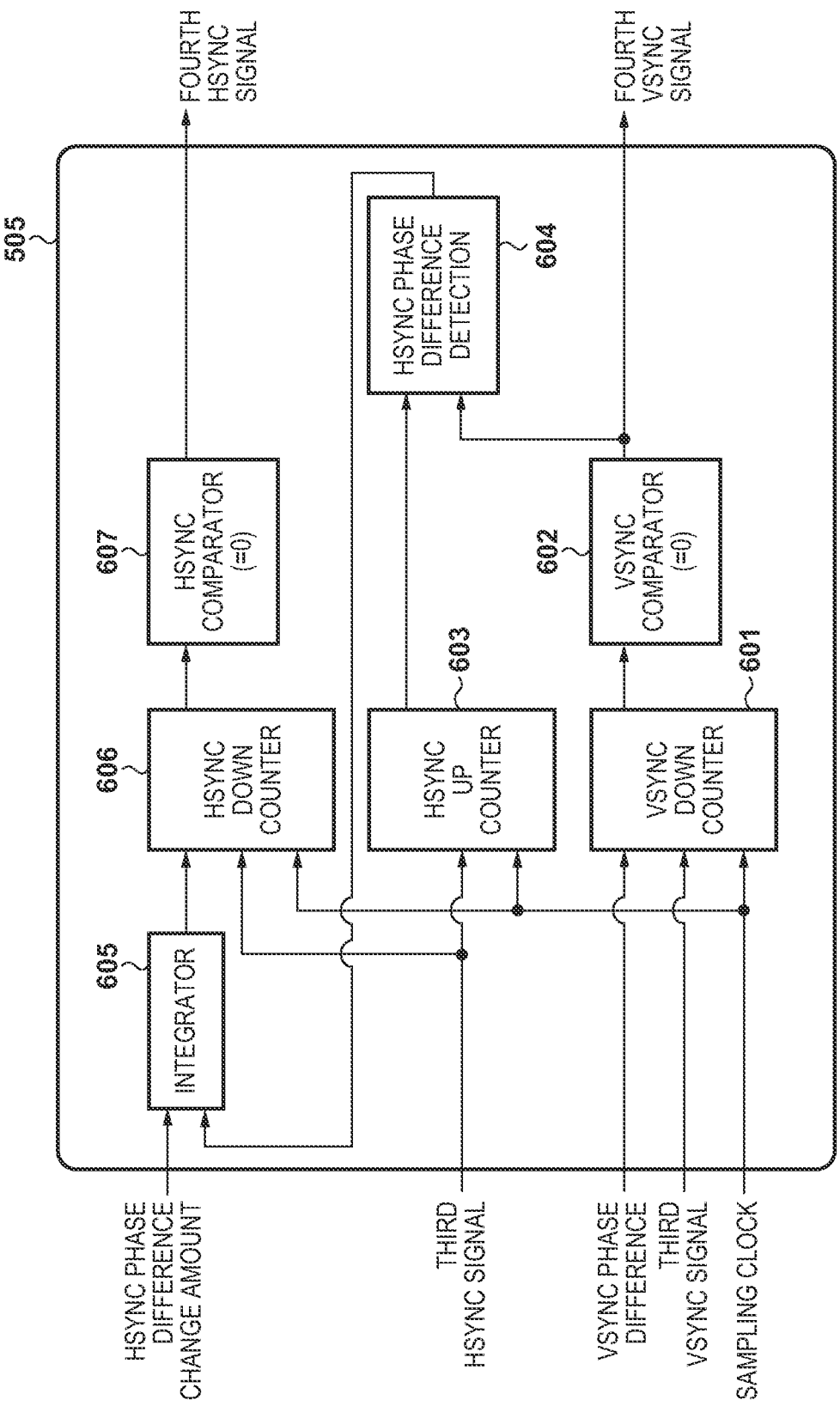

APPARATUS OF SYNCHRONIZING A VIDEO SYNCHRONIZING SIGNAL WITH ANOTHER SIGNAL AND METHOD OF CONTROLLING THE APPARATUS

BACKGROUND

Field of the Disclosure

Aspects of the disclosure generally relate to an apparatus of synchronizing a video synchronizing signal with another signal, and a method of controlling the apparatus.

Description of the Related Art

In recent years, utilization of IP is progressing in video production/transmission fields, and the signal for synchronizing a video needs to conform to IP. Therefore, SMPTE (Society of Motion Picture and Television Engineers) ST-2059 has been standardized as "PTP (Precision Time Protocol)" for enabling time synchronization in units of microsecond/nanosecond via an IP network.

It is known that, as a result of applying this technique, synchronization of video synchronizing signals (BB (Black Burst) signal or tri-level SYNC signal, which is called a GenLock signal, in general) of a plurality of devices is possible using the time of a grand master clock as a reference. Such synchronization is called PTP video synchronization.

On the other hand, a method of synchronizing the video synchronizing signal of another device that is connected a network, to a video synchronizing signal that is input from the outside, instead of using the time of a grand master clock as a reference, is known. There is a method of synchronizing video synchronizing signals of devices by the PTP video synchronization, after adjusting the time of grand master clock by extracting frequency/phase from the video synchronizing signal that is input from the outside, as specified in SMPTE EG-2059-10, for example. This method is useful when synchronization is performed in a closed group in which the time of one grand master clock is used.

In Japanese Patent No. 4528010, a technique is proposed in which an image timing packet including reference image synchronizing data is transmitted in an asynchronous packet switching network, and on a receiving side, an image synchronizing signal on the receiving side is generated based on the reference image synchronizing data and the arrival time of the image timing packet. Also, in Japanese Patent No. 4914933, a technique for enabling synchronous apparatuses in a plurality of different synchronous communication networks to perform synchronous communication to each other via an asynchronous communication network is described.

However, there are cases where, with the method for performing synchronization by adjusting the time of a grand master clock in the known technique described above, synchronization cannot be appropriately performed in a network environment where a plurality of networks in each of which time synchronization is independently performed are present. For example, if the time of a grand master clock is adjusted in each network, the times of the respective grand master clocks shift to each other, and therefore there is an issue in that synchronization across groups is not possible. When image capturing is started at a designated time, if the times of the grand master clocks shift to each other, the start of image capturing cannot be synchronized.

Also, the synchronizing method described in Japanese Patent No. 4528010 uses reference image synchronizing data indicating the difference between the time at which an image timing packet is network-transmitted based on the synchronization time provided from a reference video data processor side and the time at which a reference image synchronizing signal is created. On the receiving side, there is an issue in that, when clocks of processors are synchronized by generating operation synchronizing signals on the receiving side based on the reference image synchronizing data, the phases of the video synchronizing signals cannot be matched. Also, the synchronizing method described in Japanese Patent No. 4914933 is for realizing asynchronous communication via an asynchronous network, and is limited to time synchronization, and there is an issue in that phases of video synchronizing signals cannot be matched.

SUMMARY

According to embodiments, the frames of two video synchronizing signals can be synchronized without adjusting the time of a grand master clock.

According to embodiments, there is provided an apparatus that includes a generating unit that (i) generates synchronization format information regarding a vertical synchronizing frequency and a horizontal synchronizing frequency of a first video synchronizing signal, and (ii) generates phase difference information indicating a phase difference between the first video synchronizing signal and a first reference signal synchronized with a grand master clock; and a transmitting unit that transmits the synchronization format information and the phase difference information to an external apparatus that can generates a second video synchronizing signal synchronized with the first video synchronizing signal.

According to embodiments, there is provided an apparatus that includes a receiving unit that receives (i) synchronization format information regarding a vertical synchronizing frequency and a horizontal synchronizing frequency of a first video synchronizing signal and (ii) phase difference information indicating a phase difference between the first video synchronizing signal and a first reference signal synchronized with a grand master clock; and a generating unit that generates a second video synchronizing signal that synchronizes with the first video synchronizing signal, based on the synchronization format information, the phase difference, and a second reference signal synchronized with the grand master clock.

Further aspects of embodiments will become apparent from the following description of exemplary embodiments.

BRIEF DESCRIPTION OF THE DRAWINGS

FIG. 2 is a block diagram illustrating an exemplary configuration of a first video synchronizing apparatus in the first embodiment.

FIGS. 4A and 4B are diagrams for describing an exemplary configuration of an IP packet in the first embodiment.

FIG. 5 is a diagram illustrating an exemplary configuration of a second video synchronizing apparatus in the first embodiment.

FIG. 6 is a block diagram illustrating an exemplary configuration of a phase adjusting unit in the first embodiment.

DESCRIPTION OF THE EMBODIMENTS

Exemplary embodiments, features, and aspects of the disclosure will be described below with reference to the drawings. However, aspects of the disclosure are not limited to the following embodiments.

Figure 1:
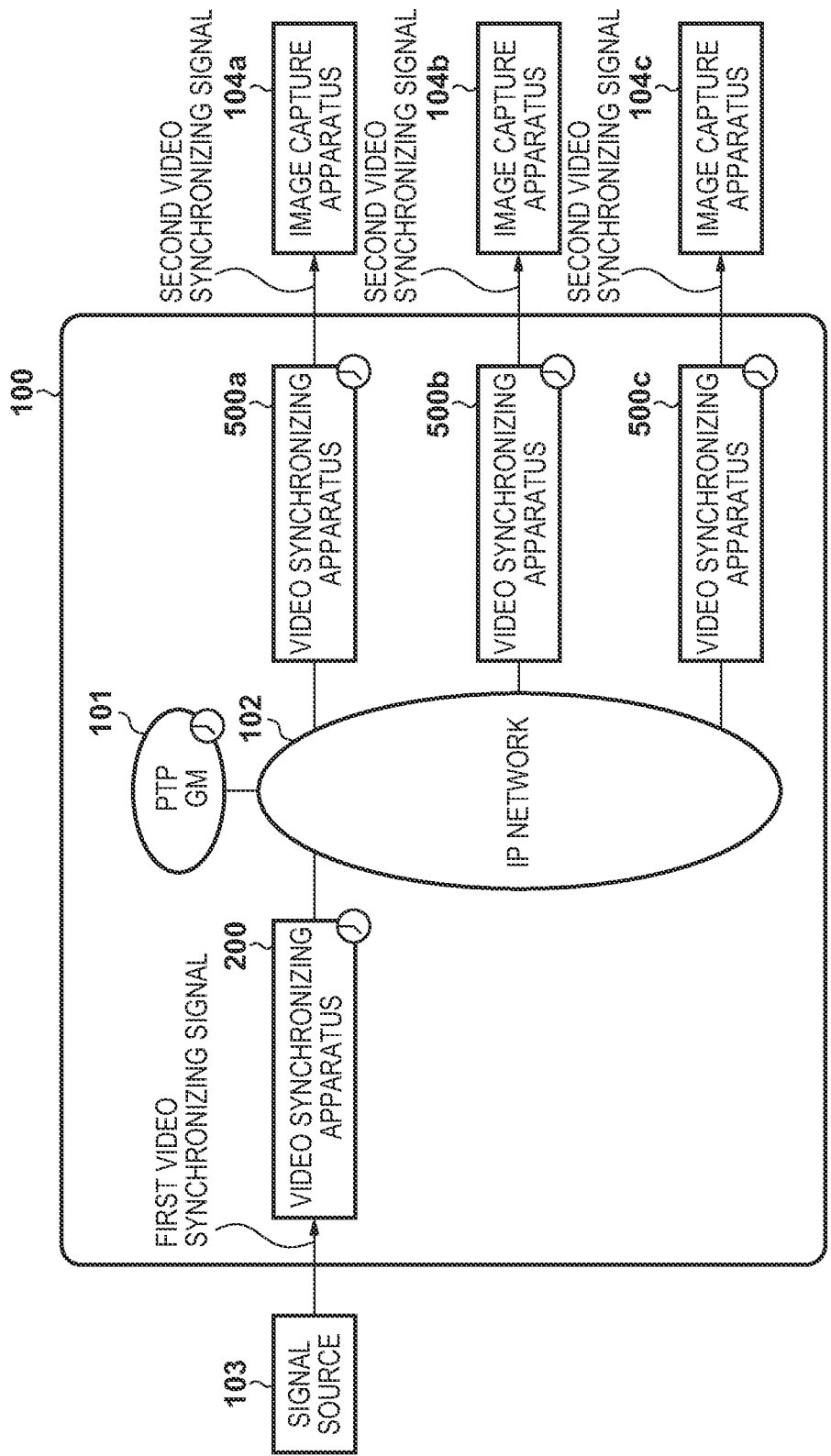
FIG. 1 is a block diagram illustrating an exemplary configuration of a video synchronizing system in a first embodiment.

<First embodiment> Hereinafter, a first embodiment will be described. FIG. 1 shows a system configuration of a video synchronizing system 100. The video synchronizing system 100 includes a video synchronizing apparatus 200 (also called as "first video synchronizing apparatus"), a PTP grand master clock 101, an IP network 102, a plurality of video synchronizing apparatuses 500*a*, 500*b*, and 500*c* (also called "second video synchronizing apparatuses").

Note that, in the first embodiment, a case where three second video synchronizing apparatuses are included will be described as an example, but there is no limitation to this example. Also, the configuration may also be such that the video synchronizing system 100 includes a video synchronizing apparatus 200 and a video synchronizing apparatus 500 in one-to-one correspondence. A signal source 103 is connected to the video synchronizing apparatus 200, and the video synchronizing apparatus 200 receives input of a first video synchronizing signal. An image capture apparatus 104*a* is connected to the video synchronizing apparatus 500*a*, an image capture apparatus 104*b* is connected to the video synchronizing apparatus 500*b*, and an image capture apparatus 104*c* is connected to the video synchronizing apparatus 500*c*. The second video synchronizing apparatuses respectively output second video synchronizing signals. The first video synchronizing signal and the second video synchronizing signals are each a BB (Black Burst) signal or a tri-level SYNC signal that is used for a video synchronization reference signal.

The signal source 103 is a synchronizing signal generator that outputs a BB (Black Burst) signal or a tri-level SYNC signal that is used for a video synchronization reference signal, in general, or a video camera that has a function similar thereto, for example. However, the signal source 103 may also be a personal computer, a mobile terminal, or the like, as long as being able to generate a similar signal. The image capture apparatuses 104*a*, 104*b*, and 104*c* are each a video camera that can perform synchronized image capturing by receiving input of a BB (Black Burst) signal or a tri-level SYNC signal, for example. However, the image capture apparatuses 104*a*, 104*b*, and 104*c* may each also be a personal computer, a mobile terminal, or the like, as long as being able to perform image capturing by receiving a similar signal.

The video synchronizing apparatus 200 and the video synchronizing apparatuses 500*a*, 500*b*, and 500*c* perform time synchronization using the PTP grand master clock 101 and the PTP IEEE 1588 protocol specified in SMPTE 2059-1/-2 via the IP network 102. The time synchronization conforms to the standard, and therefore detailed description will be omitted. Note that, in a configuration in which the PTP grand master clock 101 is not used, time synchronization in which a clock signal output from the video synchronizing apparatus 200 or the video synchronizing apparatus 500*a*, 500*b*, or 500*c* functions as the master clock is performed.

Next, an exemplary configuration of the video synchronizing apparatus 200 (that is, first video synchronizing apparatus) will be described with reference to FIG. 2. The video synchronizing apparatus 200 includes a synchronizing signal input unit 201, a video format detecting unit 202, a phase difference detecting unit 203, a multiplying unit 204, a reference signal generating unit 205, a PTP controller 206, a network communication unit 207, and a system controller 208.

The synchronizing signal input unit 201 receives input of the first video synchronizing signal from the signal source 103. The synchronizing signal input unit 201 extracts a first HSYNC signal (horizontal synchronizing signal) and a first VSYNC signal (vertical synchronizing signal) that indicate video frame timing from the first video synchronizing signal, and outputs the extracted signals to the video format detecting unit 202 and the phase difference detecting unit 203. The video format detecting unit 202 detects the synchronization format (also called as "video format") of the first video synchronizing signal based on the first HSYNC signal and the first VSYNC signal. The synchronization format (video format) is information for enabling specification of the vertical synchronizing frequency and horizontal synchronizing frequency of the video synchronizing signal, and includes later-described 1080/60i, for example. The extracted synchronization format information is notified to the system controller 208, and is also notified to the reference signal generating unit 205 via the system controller 208.

The network communication unit 207, upon receiving a request from the system controller 208 and the PTP controller 206, performs packet communication with an external device that is connected by the IP network 102. The PTP controller 206 performs time synchronization using the PTP grand master clock 101 and the PTP IEEE 1588 protocol specified in SMPTE 2059-1/-2 via the network communication unit 207. Also, the PTP controller 206 updates a time stamp indicating the current time that is universally clocked, and also notifies the reference signal generating unit 205 of the time stamp.

The reference signal generating unit 205 determines a reference format of a first reference signal to be generated in accordance with the synchronization format information. Also, the reference signal generating unit 205 calculate NextAlignmentPoint indicating a frame head of the first reference signal, which is specified in SMPTE 2059-1/-2, based on the time stamp, and determines the phase of the first reference signal. A second HSYNC signal and a second VSYNC signal of the first reference signal that are generated with this procedure are output to the phase difference detecting unit 203, and a pixel clock is output to the multiplying unit 204. The multiplying unit 204 multiplies the pixel clock by four, and outputs the resultant signal to the phase difference detecting unit 203 as a sampling clock.

The phase difference detecting unit 203 detects a VSYNC phase difference by comparing the first VSYNC signal with the second VSYNC signal. Similarly, an HSYNC phase difference is detected by comparing the first HSYNC signal with the second HSYNC signal, and an HSYNC phase difference change amount is calculated from the difference from the prior HSYNC phase difference. The phase difference detecting unit 203 notifies the system controller 208 of phase difference information including the obtained VSYNC phase difference and HSYNC phase difference change amount. The system controller 208 converts the synchronization format and phase difference information into a network communication protocol, and performs multicast stream transmission of this result to the video synchronizing apparatuses 500a, 500b, and 500c via the network communication unit 207. Note that the system controller 208 includes at least one processor such as a CPU, a nonvolatile memory such as a ROM, and a volatile memory such as a RAM. The at least one processor deploys a program stored in the nonvolatile memory to the volatile memory and executes the program, and with this, the process in the later-described video synchronizing apparatus 200 and overall operations of the video synchronizing apparatus 200 are controlled.

Figure 3A:
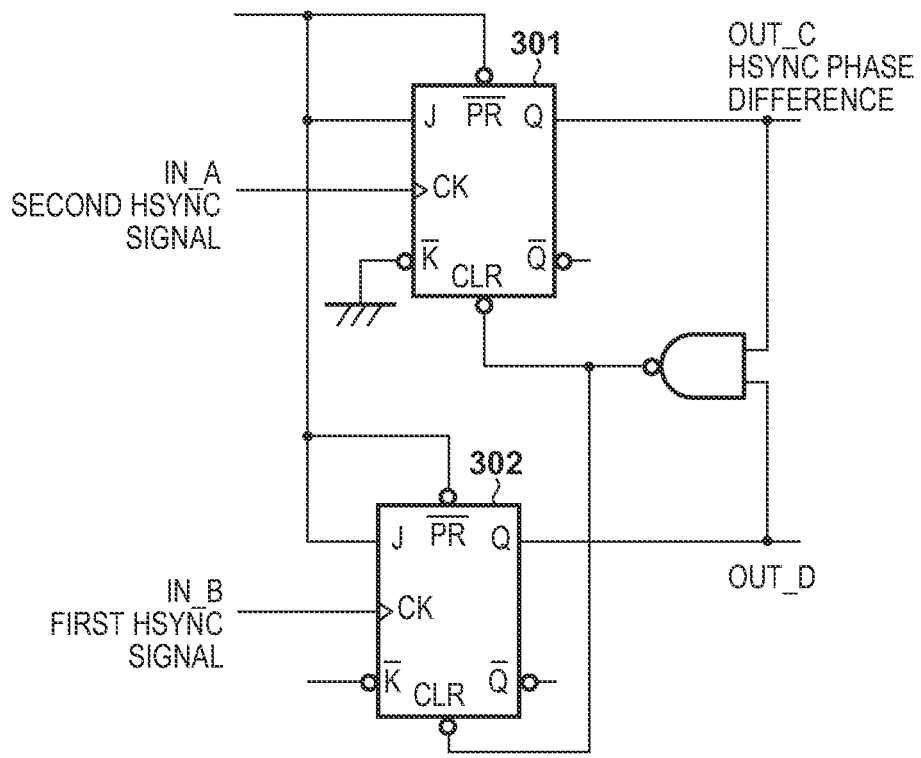
FIGS. 3A and 3B are diagrams illustrating an exemplary configuration of a phase difference detecting unit in the first embodiment.

Next, a phase difference detecting method to be executed in the phase difference detecting unit 203 will be described using HSYNC phase difference detection as an example, with reference to FIGS. 3A and 3B. An example of a phase frequency comparator in which two flip-flops and a NAND circuit are used is shown in FIG. 3A. For example, the second HSYNC signal is input to an input IN_A of the flip-flop 301, and the first HSYNC signal is input to an input IN_B of the flip-flop 302.

Figure 3B:
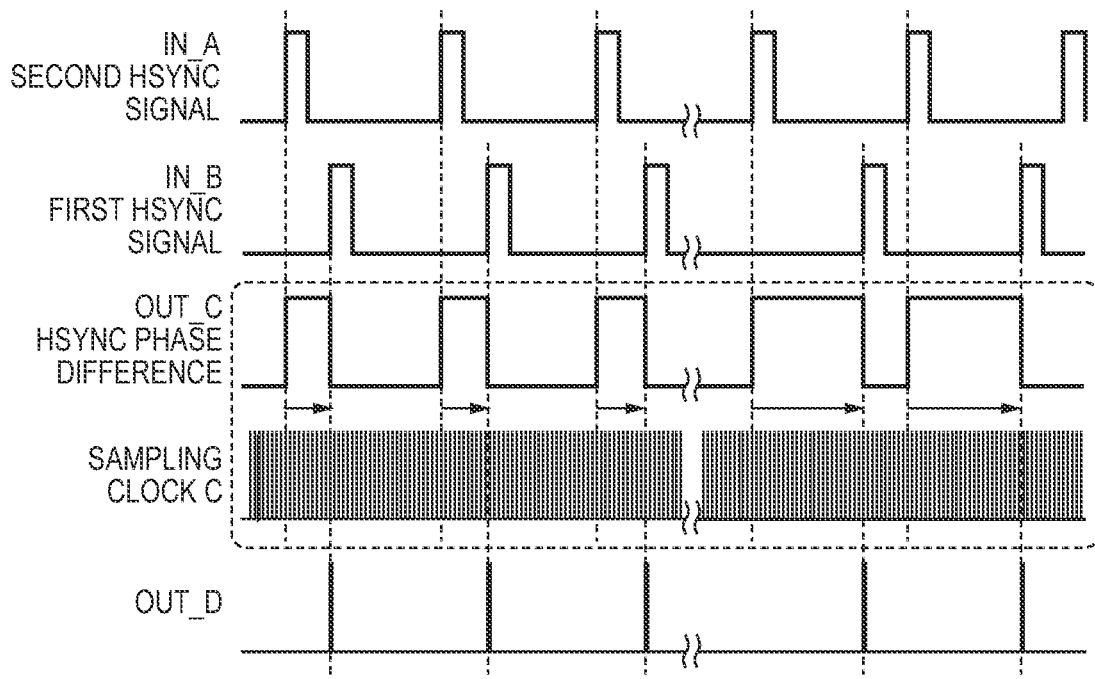

FIG. 3B shows operations of the phase frequency comparator. For example, OUT_C changes to high at a rising edge of IN_A, and next at a rising edge of IN_B, OUT_D becomes high in a short period of time. At this point in time, the NAND output changes to low, the flip-flop is cleared, and OUT_C changes to low. Accordingly, a pulse of a duty ratio according to the HSYNC phase difference between the second HSYNC signal and the first HSYNC signal is output from OUT_C.

As a result of performing sampling of this signal with the sampling clock, the HSYNC phase difference that is converted into a digital value is obtained. As a result of obtaining the difference over time of the acquired HSYNC phase difference, the HSYNC phase difference change amount can be calculated. With similar configuration, the second VSYNC signal is compared with the first VSYNC signal, and the VSYNC phase difference change amount can be obtained. Note that another configuration may be used as long as the VSYNC phase difference and the HSYNC phase difference change amount can be acquired.

In the following, a flow until acquiring the VSYNC phase difference and the HSYNC phase difference change amount will be described using a case where the synchronization format is 1080/60i as an example. The VSYNC frequency in the 1080/60i format is 60 Hz, the HSYNC frequency is 33.75 kHz, and the pixel clock is 74.25 MHz, and the sampling clock that is multiplied by four in the multiplying unit 204 is at 297 MHz. As a result of multiplying the sampling clock to 297 MHz in the multiplying unit 204, a phase difference about 3.4 ns can be detected. Note that this phase difference is less than 4% of the accuracy of 100 ns or less of the time synchronization by the PTP IEEE 1588 protocol, and is sufficiently small. When the pixel clock accuracy of the first video synchronizing signal is 100 ppm, the phase changes by ±2.97 ns at maximum in one cycle of HSYNC, and this change can be mostly captured.

When the VSYNC frequency is 60 Hz, the number of clocks in one cycle of VSYNC at a sampling clock of 297 MHz is 4,950,000, and therefore the VSYNC phase difference can be expressed by a digital value, if the data width is 23 bits or more. The HSYNC phase difference change amount is about one clock in one cycle, when the pixel clock accuracy of the first video synchronizing signal is 100 ppm. Therefore, the HSYNC phase difference change amount can be expressed by a digital value, if the data width is 2 bits or more. In the first embodiment, a case where 23 bits are assigned to the VSYNC phase difference, and 3 bits are assigned to the HSYNC phase difference change amount will be described as an example.

FIGS. 4A and 4B illustrate the configuration of an IP packet in the first embodiment in a simplified manner. An IP header portion 401 is determined by the protocol to be used for multicast stream transmission, and the configuration of a data portion is switched between a case where the VSYNC phase difference is transmitted and a case where the HSYNC phase difference change amount is transmitted. FIG. 4A shows an exemplary configuration of an IP packet when the VSYNC phase difference is to be transmitted. The data portion is arranged after a start bit 402 that is "0". 1 bit (identification information 403) for identifying the VSYNC phase difference data is set to "1", and thereafter 8 bits (synchronization format 404) for indicating the synchronization format, and 23 bits (VSYNC phase difference 405) for indicating the VSYNC phase difference follow. Moreover, CRC (Cyclic Redundancy Check) 406 of an error detecting code follows thereafter, and finally the end of the data portion is indicated by an end bit 407 that is "1".

FIG. 4B shows an exemplary configuration of an IP packet when the HSYNC phase difference change amount is transmitted. In the data portion, after a start bit 402 that is "0", 1 bit (identification information 403) for indicating HSYNC phase difference change amount data is set to "0", and thereafter, 3 bits (HSYNC phase difference change amount 410) for indicating the HSYNC phase difference change amount follows. Thereafter, CRC 406 of an error detecting code follows, and finally an end bit 407 indicates the end of the data portion. With such packet configurations, the traffic load can be reduced.

Next, an exemplary configuration of the video synchronizing apparatuses 500 (second video synchronizing apparatuses) will be described with reference to FIG. 5. The video synchronizing apparatus 500 includes a network communication unit 501, a PTP controller 502, a reference signal generating unit 503, a multiplying unit 504, a phase adjusting unit 505, a PLL adjusting unit 506, a synchronizing signal output unit 507, and a system controller 508.

The network communication unit 501, upon receiving a request from the system controller 508 and the PTP controller 502, performs packet communication with an external device connected by the IP network 102. The network communication unit 501 receives multistream data including the synchronization format and the phase difference information from the video synchronizing apparatus 200. The PTP controller 502 performs time synchronization using the PTP grand master clock 101 and the PTP IEEE 1588 protocol specified in SMPTE 2059-1/-2, via the network communication unit 501. Also, the PTP controller 502 updates a time stamp indicating the current time that is universally clocked, and also notifies the reference signal generating unit 503 of the time stamp.

The system controller 508 acquires the synchronization format and the phase difference information from the multistream data received by the network communication unit 501. The synchronization format information is notified to the reference signal generating unit 503, and the phase difference information is notified to the phase adjusting unit 505. Note that the system controller 508 includes at least one processor such as a CPU, a nonvolatile memory such as a ROM, and a volatile memory such as a RAM. The at least one processor deploys a program stored in the nonvolatile memory to the volatile memory and executes the program, and with this, the process in the later-described video synchronizing apparatus 500 and overall operations of the video synchronizing apparatus 500 are controlled.

The reference signal generating unit 503 determines the reference format of a second reference signal that is generated in accordance with the synchronization format information. Also, the reference signal generating unit 503 calculate NextAlignmentPoint indicating a frame head of the second reference signal, which is specified in SMPTE 2059-1/-2, based on the time stamp, and determines the phase of the second reference signal. The reference signal generating unit 503 outputs a third HSYNC signal and a third VSYNC signal of the generated second reference signal to the phase adjusting unit 505, and outputs a second pixel clock to the multiplying unit 504. The multiplying unit 504 multiplies the pixel clock so as to match the multiplication factor of the multiplying unit 204, that is, multiplies by four, for example, and outputs the resultant signal to the phase adjusting unit 505 as a sampling clock.

The phase adjusting unit 505 applies offsets to the third HSYNC signal and the third VSYNC signal based on the received phase difference information and outputs the resultant signals to the later stages as a fourth HSYNC signal and a fourth VSYNC signal.

FIG. 6 shows an exemplary configuration of the phase adjusting unit 505 for performing an offset process on the third HSYNC signal and the third VSYNC signal. The phase adjusting unit 505 includes a VSYNC down counter 601, a VSYNC comparator 602, an HSYNC up counter 603, an HSYNC phase difference detector 604, an integrator 605, an HSYNC down counter 606, and an HSYNC comparator 607.

The VSYNC down counter 601 reads in a VSYNC phase difference signal when the third VSYNC signal is input in synchronization with the sampling clock that is input. Thereafter, the VSYNC down counter 601 counts down until the count value becomes −1.

When the count value of the VSYNC down counter 601 is equal to 0, the VSYNC comparator 602 outputs the fourth VSYNC signal. The fourth VSYNC signal is a signal obtained by delaying the third VSYNC signal by the VSYNC phase difference. When the third HSYNC signal is input, the HSYNC up counter 603 is cleared to 0, and thereafter continues to count up. When the fourth VSYNC is input, the HSYNC phase difference detector 604 detects the count value of the HSYNC up counter 603 as the HSYNC phase difference.

The integrator 605 receives the HSYNC phase difference, integrates the HSYNC phase difference change amount, and outputs the integrated result as the next HSYNC phase difference. When the third HSYNC signal is input, the HSYNC down counter 606 reads in the HSYNC phase difference generated by the integrator 605, and starts counting down until the count value becomes −1. When the count value of the HSYNC down counter 606 becomes equal to 0, the HSYNC comparator 607 outputs the fourth HSYNC signal. The fourth HSYNC signal is a signal obtained by delaying the third HSYNC signal according to the VSYNC phase difference and the HSYNC phase difference change amount.

Figure 7:
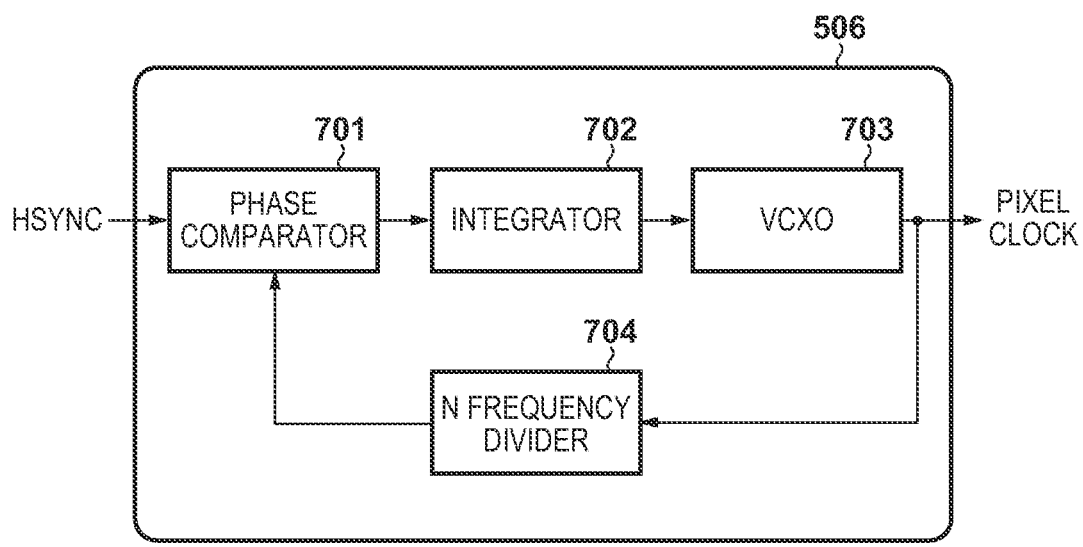
FIG. 7 is a block diagram illustrating an exemplary configuration of a PLL adjusting unit in the first embodiment.

The PLL adjusting unit 506 generates a third pixel clock that is in synchronization with the fourth HSYNC signal, and outputs the third pixel clock to the synchronizing signal output unit 507. An exemplary configuration of the PLL adjusting unit 506 is shown in FIG. 7. The PLL adjusting unit 506 includes a phase comparator 701, an integrator 702, a VCXO 703, and an N frequency divider 704.

The VCXO 703 is an oscillator that can control the oscillating frequency according to an input voltage, and outputs a pixel clock. In the VCXO 703 of the first embodiment, as the input voltage increases, the oscillating frequency increases, for example. The N frequency divider 704 is a frequency divider that generates a signal by frequency-dividing the pixel clock by N. In the PLL adjusting unit 506 of the first embodiment, the reference signal is HSYNC, and therefore the dividing ratio N is the number of pixel clocks in the HSYNC period.

The phase comparator 701 compares the phase of the input HSYNC and the phase of the frequency divided signal output from the N frequency divider 704. Also, if the input of the frequency divided signal is delayed from the input of HSYNC (that is, if the frequency of the frequency divided signal is lower), the phase comparator 701 outputs a positive constant current in a period in which the phase difference is occurring. On the other hand, if the input of the frequency divided signal is advanced relative to the input of HSYNC (that is, if the frequency of the frequency divided signal is higher), the phase comparator 701 outputs a negative constant current in a period in which the phase difference is occurring.

The integrator 702 integrates the current output from the phase comparator 701, and supplies a voltage to the VCXO 703.

In this way, the PLL adjusting unit 506 controls the oscillating frequency of the VCXO 703 based on the phase difference between the input HSYNC and the frequency divided signal. As a result, as time elapses, the frequency and the phase match between the input HSYNC and the frequency divided signal.

The synchronizing signal output unit 507 generates a second video synchronizing signal based on the third pixel clock output from the PLL adjusting unit 506 using the timing of the fourth HSYNC signal and the fourth VSYNC signal as a trigger.

As described above, in the first embodiment, the video synchronizing system 100 includes the video synchronizing apparatus 200 that receives input of the first synchronizing signal and the video synchronizing apparatus 500 that outputs the second synchronizing signal in synchronization with the first synchronizing signal. The video synchronizing apparatus 200 and the video synchronizing apparatus 500 are configured to be able to communicate via the IP network 102. Also, the PTP grand master clock 101 is present in the IP network 102, and the video synchronizing apparatus 200 and the video synchronizing apparatus 500 are configured to perform time synchronization using PTP.

The video synchronizing apparatus 200 detects the synchronization format from the first video synchronizing signal, and generates the phase difference information by comparing the first video synchronizing signal and the first reference signal that is generated based on time synchronization. Also, the video synchronizing apparatus 200 transmits (i) synchronization format and (ii) the phase difference information to the video synchronizing apparatus 500. The video synchronizing apparatus 500 can output the second video synchronizing signal that is obtained by applying an offset, based on the phase difference information, to the phase of the second reference signal that matches the synchronization format and is generated based on time synchronization. In this way, the frame synchronization between the first video synchronizing signal and the second video synchronizing signal can be achieved without adjusting the time of the grand master clock.

<Second embodiment> Next, a second embodiment will be described. In the second embodiment, a system controller 208 of a video synchronizing apparatus 200 changes the transmitting timing of phase difference data that is transmitted from a network communication unit 207 according to whether or not the phase difference change amount of HSYNC and VSYNC that is calculated by a phase difference detecting unit 203 is constant. As a result, the number of IP packets transmitted between a video synchronizing apparatus 200 and a video synchronizing apparatus 500 can be reduced.

Note that the second embodiment differs from the first embodiment in that the system controller 208 of the video synchronizing apparatus 200 changes the transmitting timing of a phase difference change amount packet. However, the configuration of the video synchronizing apparatus 200 and video synchronizing apparatus 500 in the second embodiment may be the same as or substantially the same as that of the first embodiment described above. Therefore, the constituent elements that are the same as or substantially the same as those of the first embodiment are given the same reference signs, the description thereof is omitted, and the differences will be mainly described.

Figure 8:
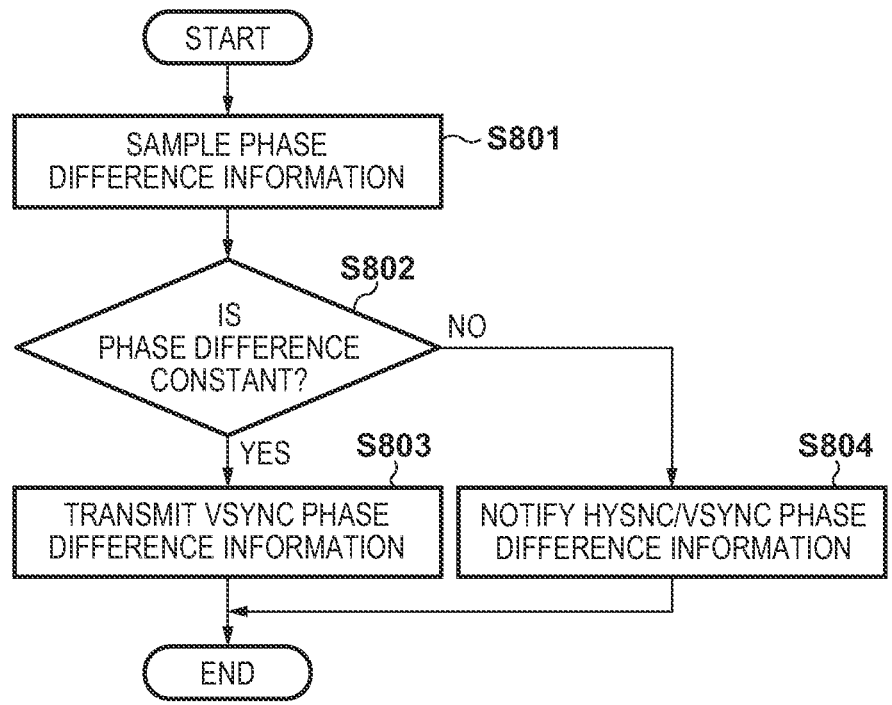
FIG. 8 is a flowchart illustrating a change process of transmitting timing of a phase difference change amount packet in a second embodiment.

A series of operations in the process in which the system controller 208 of the video synchronizing apparatus 200 changes the transmitting timing of the phase difference change amount packet will be described with reference to FIG. 8. Note that this process is realized by, in the system controller 208, at least one processor controlling the units of the video synchronizing apparatus 200 by deploying a program stored in a nonvolatile memory to a volatile memory and executing the program, unless otherwise specified. Also, this process is started using, as a trigger, the fact that the synchronizing signal input unit 201 has received an input of a video synchronizing signal, and extracted an HSYNC signal and a VSYNC signal, and moreover time synchronization has been established based on a packet from the network communication unit 207.

In step S801, the phase difference detecting unit 203 samples the phase difference information. For example, the phase difference detecting unit 203 transmits the phase difference information to the system controller 208 at predetermined intervals. In step S802, system controller 208 determines whether or not the phase difference is constant (that is, the change in phase difference is in a predetermined range) from a received plurality of pieces of phase difference information. If it is determined that the phase difference is constant, the system controller 208 transmits information indicating that there is no change in the phase difference to the network communication unit 207, and the process proceeds to step S803. On the other hand, if it is determined that the phase difference is not constant (that is, the change in phase difference is larger than the predetermined range), the system controller 208 transmits information indicating that there is a change in the phase difference to the network communication unit 207, and the process proceeds to step S804.

In step S803, because there is no change in the phase difference, the system controller 208 controls the network communication unit 207 so as to reduce the number of IP packets for transmitting the phase difference information to the video synchronizing apparatus 500. Here, the system controller 208 transmits the phase difference information to the video synchronizing apparatus 500 only at the timing of VSYNC. Thereafter, the system controller 208 ends the process illustrated in the flowchart of FIG. 8.

In step S804, because there is a change in the phase difference, the system controller 208 controls the network communication unit 207 so as to not reduce the number of IP packets for transmitting the phase difference information to the video synchronizing apparatus 500. Here, the system controller 208 transmits the phase difference information to the video synchronizing apparatus 500 at the timing of HSYNC and VSYNC. Thereafter, the system controller 208 ends the process illustrated in the flowchart of FIG. 8. Note that, in the example described above, the timing at which the phase difference information is transmitted is only the timing of HSYNC and VSYNC, but transmission may be performed using another timing.

As described above, in the second embodiment, when the phase difference is constant, the video synchronizing apparatus 200 performs control so as to reduce the number of packets for transmitting the phase difference information to the video synchronizing apparatus 500. As a result, the number of packets transmitted between the video synchronizing apparatus 200 and the video synchronizing apparatus 500 can be reduced, and the network band can be effectively used.

<Third embodiment> Next, a third embodiment will be described. In the above described embodiments, the video synchronizing apparatus 500 performs phase difference adjustment using the phase difference information from the video synchronizing apparatus 200. The time of rising edge timing of the third VSYNC signal, which is the reference when this phase difference adjustment is performed, is necessarily prior to the time of rising edge timing of the second VSYNC signal regarding which the video synchronizing apparatus 200 has detected the VSYNC phase difference.

This phase difference information indicates the phase difference between the at least one prior rising edge that is at the same timing as the rising edge of the third VSYNC signal and is at the rising edge timing of the second VSYNC signal in the video synchronizing apparatus 200, and the rising edge of the first VSYNC signal.

On the other hand, the first video synchronizing signal input from the signal source 103 is asynchronous with the first reference signal generated by the reference signal generating unit 205 in the video synchronizing apparatus 200, and therefore the phase difference is not constant, and may change over time.

That is, the phase difference at the rising edge of the VSYNC signal at the same time differs between the video synchronizing apparatus 200 and the video synchronizing apparatus 500. Also, a phase difference occurs between the first video synchronizing signal received by the video synchronizing apparatus 200 and the second video synchronizing signal output by the video synchronizing apparatus 500. Also, when the network latency between the video synchronizing apparatus 200 and the video synchronizing apparatus 500 increases, and the transmission delay of the phase difference information increases, the phase difference between the first video synchronizing signal and the second video synchronizing signal also increases.

Therefore, in the third embodiment, a video synchronizing apparatus 900 predicts the phase difference at a time to come based on phase difference information at a prior time, and transmits the predicted phase difference to a video synchronizing apparatus 1200 as the phase difference information. Also, the video synchronizing apparatus 1200 in third embodiment performs phase adjustment by applying an offset to the second reference signal based on the phase difference information including the phase difference predicted by the video synchronizing apparatus 900, and output the resultant signal as the second video synchronizing signal.

Figure 9:
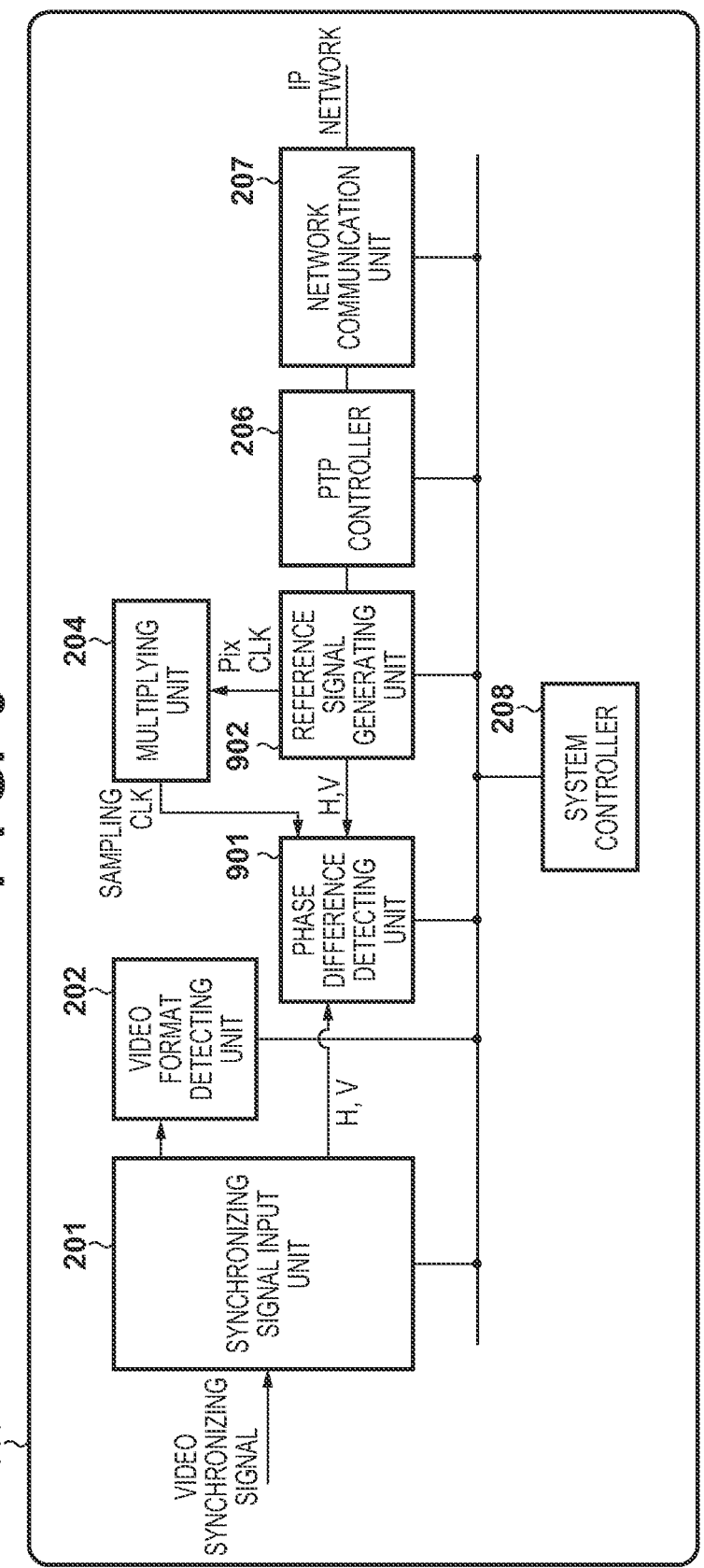
FIG. 9 is a block diagram illustrating an exemplary configuration of a first video synchronizing apparatus according to a third embodiment.

First, an exemplary configuration of the video synchronizing apparatus 900 in the third embodiment will be described with reference to FIG. 9. Note that the video synchronizing apparatus 900 differs from the above described embodiments regarding the configuration of a phase difference detecting unit 901 and a reference signal generating unit 902, but the configurations and operations of the other constituent elements may be the same as or substantially the same as those in the above described embodiments. Therefore, the constituent elements and operations similar to those in the first embodiment described above are given the same reference signs and the description thereof is omitted.

The reference signal generating unit 902 outputs time information based on a time stamp to the phase difference detecting unit 901 in addition to a reference signal. The phase difference detecting unit 901 predicts the phase difference at a time to come using a detected phase difference and a phase difference at a prior time. Also, the phase difference detecting unit 901 generates phase difference time information corresponding to the predicted phase difference based on the time information input from the reference signal generating unit 902. Then, the phase difference detecting unit 901 notifies a system controller 208 of phase difference information constituted by the predicted phase difference and the phase difference time information corresponding to the predicted phase difference.

The phase difference time information is time information indicating the rising edge timing of a VSYNC signal at which the predicted phase difference will be detected, from the time information input from the reference signal generating unit 902 and a rising edge timing of the VSYNC signal regarding which the phase difference is to be detected. Also, the phase difference detecting unit 901 notifies the system controller 208 of a plurality pieces of phase difference time information and predicted phase differences corresponding to the pieces of phase difference time information as the phase difference information.

Figure 10:
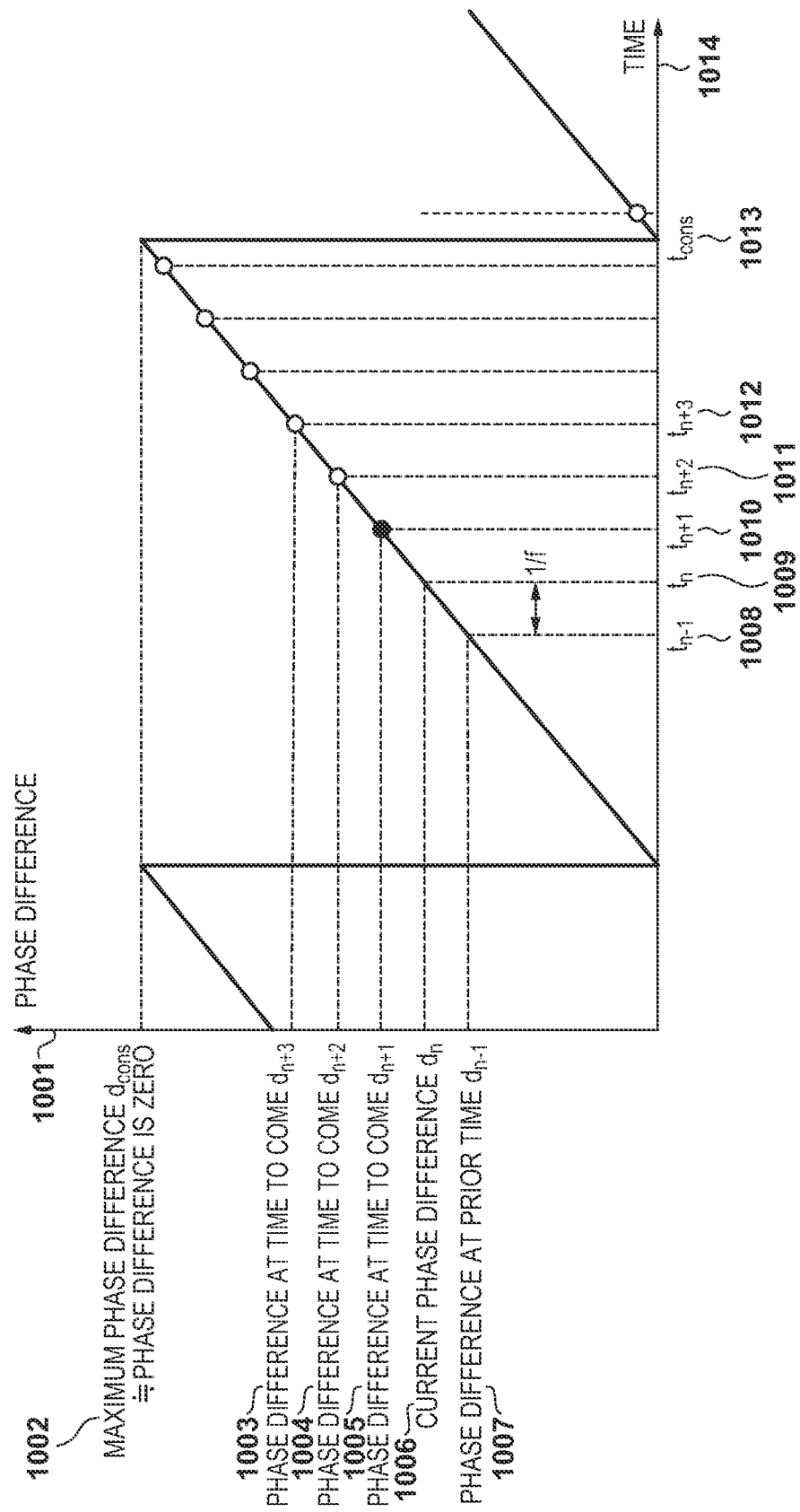
FIG. 10 is a conceptual diagram for describing a process of predicting a phase difference at a time to come in the third embodiment.

Next, the process of predicting the phase difference at a time to come in the phase difference detecting unit 901 will be described with reference to FIG. 10. FIG. 10 illustrates the change in phase difference over time when the change is linear. This diagram shows a time of the rising edge timing $t_n$ 1009 at which the phase difference of the second VSYNC signal is detected and the detected current phase difference $d_n$ 1006, in the phase difference detecting unit 901, the vertical axis being the phase difference 1001 and the horizontal axis being the time 1014.

Also, in FIG. 10, the phase difference $d_{n-1}$ at a prior time is denoted by 1007 and the time of the rising edge timing $t_{n-1}$ at which the phase difference of the second VSYNC signal at a prior time is detected is denoted by 1008. Moreover, the phase differences $d_{n+1}$ to $d_{n+3}$ at times to come are respectively denoted by 1005 to 1003, and times of the rising edge timing $t_{n+1}$ to $t_{n+3}$ of the second VSYNC signal at which the phase differences at times to come will be detected are respectively denoted by 1010 to 1012.

A maximum phase difference $d_{cons}$ (that is, 1002) is in a state in which the phase difference between the first VSYNC signal and the second VSYNC signal is zero (same phase), but in order to use the maximum phase difference in a calculation formula for predicting a phase difference at a time to come, the phase difference between rising edges of the VSYNC signals is shown as the maximum phase difference. Also, the time $t_{cons}$ (that is, 1013) at which the maximum phase difference $d_{cons}$ is achieved is calculated by the following calculation formula (Formula 1).

$$t_{cons} = \left(\frac{t_n - t_{n-1}}{d_n - d_{n-1}}\right) \times (d_{cons} - d_n) + t_n$$

Also, phase difference prediction at a time to come is calculated using a later-described calculation formula. Note that the calculation formula differs according to whether the time of the rising edge timing of the second VSYNC signal at which the phase difference at a time to come will be detected is larger than $t_{cons}$ or smaller than $t_{cons}$.

First, when the time of the rising edge timing of the second VSYNC signal at which the phase difference at a time to come will be detected is smaller than $t_{cons}$, the calculation is performed according to the following calculation formula (Formula 2).

$$d_{n+1} = \left(\frac{d_n - d_{n-1}}{t_n - t_{n-1}}\right) \times (t_{n+1} - t_n) + d_n$$

On the other hand, when the time of the rising edge timing of the second VSYNC signal at which the phase difference at a time to come will be detected is larger than $t_{cons}$, the calculation is performed according to the following calculation formula (Formula 3).

$$d_{n+1} = \left(\frac{d_n - d_{n-1}}{t_n - t_{n-1}}\right) \times (t_{n+1} - t_{cons})$$

Note that the calculation formula is shown regarding a case where the phase difference $d_{n+1}$ at a time to come is to be calculated, as an example. However, the phase difference $d_{n+2}$ or $d_{n+3}$ at a time to come can also be calculated by replacing the time of the rising edge timing of the second VSYNC signal at which the phase difference at a time to come will be detected with $t_{n+2}$ or $t_{n+3}$.

Figure 11:
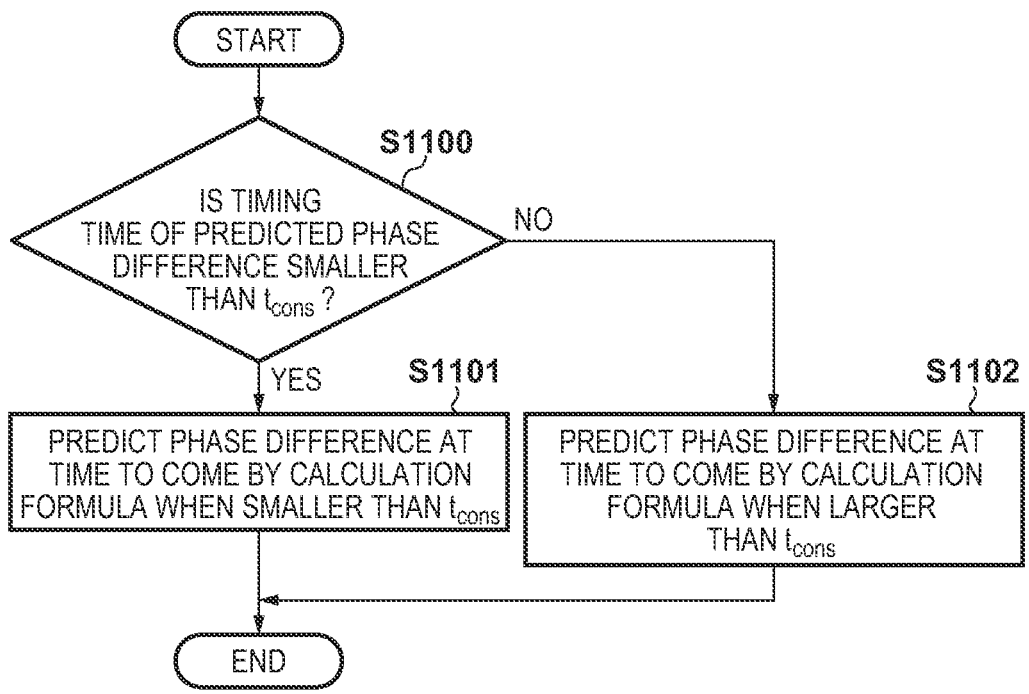
FIG. 11 is a flowchart illustrating operations for predicting a phase difference at a time to come in a phase difference detecting unit in the third embodiment.

Next, a series of operations for predicting the phase difference at a time to come in the phase difference detecting unit 901 will be described with reference to FIG. 11. Note that this process may be realized by hardware for configuring the phase difference detecting unit 901, or may be realized by executing a program stored in a nonvolatile memory.

In step S1100, the phase difference detecting unit 901 determines whether or not the time of the rising edge timing of the second VSYNC signal at which the predicted phase difference will be detected is smaller than $t_{cons}$. The phase difference detecting unit 901, if it is determined that the time of the timing is smaller than $t_{cons}$, advances the process to step S1101, and if not, advances the process to step S1102.

In step S1102, if the time of the rising edge timing of the second VSYNC signal at which the predicted phase difference will be detected is smaller than $t_{cons}$, the phase difference detecting unit 901 calculates the predicted value of the phase difference using the calculation formula (Formula 2) described above. Thereafter, the phase difference detecting unit 901 ends this operation.

In step S1103, if the time of the rising edge timing of the second VSYNC signal at which the predicted phase difference will be detected is larger than $t_{cons}$, the phase difference detecting unit 901 calculates the predicted value of the phase difference using the calculation formula (Formula 3) described above. Thereafter, the phase difference detecting unit 901 ends this operation.

Figure 12:
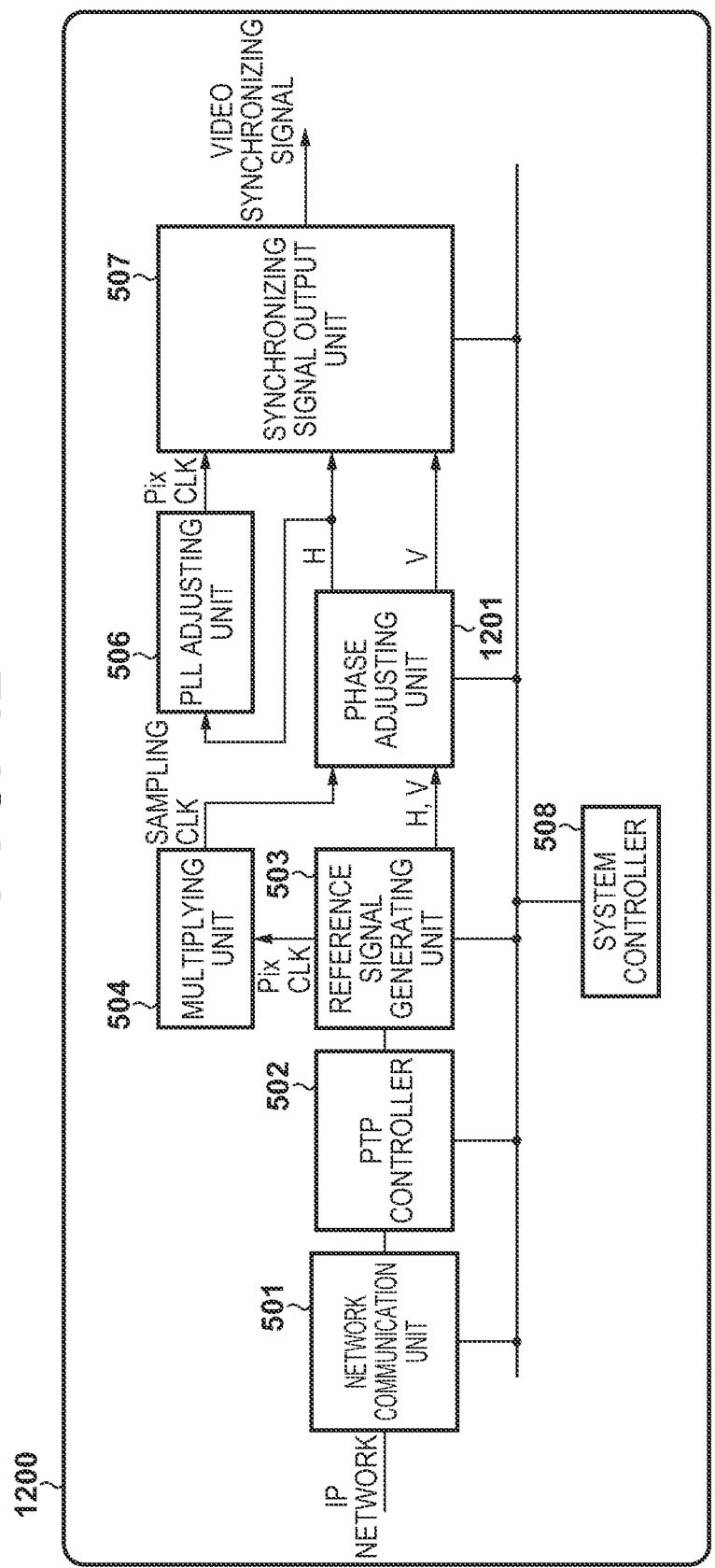
FIG. 12 is a block diagram illustrating an exemplary configuration of a second video synchronizing apparatus in the third embodiment.

Next, an exemplary configuration of the video synchronizing apparatus 1200 in the third embodiment will be described with reference to FIG. 12. Note that the constituent elements and operations similar to those in the above described embodiments are given the same reference signs and the description thereof is omitted, similarly to the video synchronizing apparatus 900.

A phase adjusting unit 1201 acquires phase difference time information that matches the time of timing at which the next phase adjustment is to be performed from the phase difference information. Also, the phase adjusting unit 1201 performs phase adjustment using the phase difference corresponding to the acquired phase difference time information.

Figure 13:
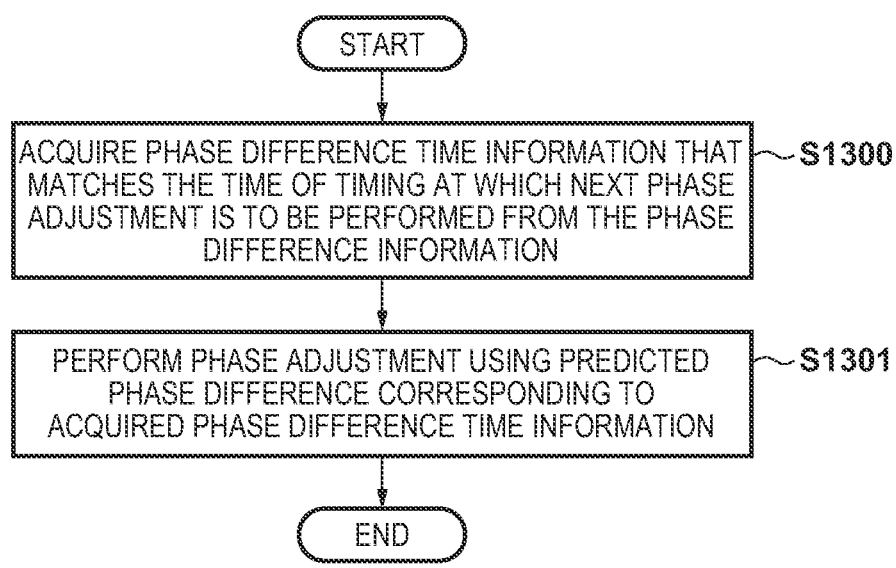
FIG. 13 is a flowchart illustrating phase adjustment operations in a phase adjusting unit in the third embodiment.

A series of operations for adjusting the phase using the predicted phase difference, in the phase adjusting unit 1201, will be described with reference to FIG. 13.

In step S1300, the phase adjusting unit 1201 acquires phase difference time information that matches the time of timing at which the next phase adjustment is to be performed from the phase difference information. In step S1301, the phase adjusting unit 1201 performs phase adjustment using the predicted phase difference corresponding to the acquired phase difference time information. Then, the phase adjusting unit 1201 ends the operations for adjusting the phase using the predicted phase difference.

As described above, in the third embodiment, the phase difference at a time to come is predicted using a phase difference detected by the first video synchronizing apparatus and a phase difference at a prior time, and a plurality of predicted phase differences and pieces of phase difference time information indicating the time of timing at which the predicted phase difference will be detected are transmitted to the video synchronizing apparatus. As a result, the phase difference at the rising edge between the first VSYNC signal and the second VSYNC signal at the same time matches between the first video synchronizing apparatus and the second video synchronizing apparatus. Therefore, the phase matches between the first video synchronizing signal that is input to the first video synchronizing apparatus and the second video synchronizing signal that is output from the second video synchronizing apparatus. Moreover, as a result of transmitting a plurality of predicted phase differences, occurrence of a phase difference can be suppressed even if the network latency between the first video synchronizing apparatus and the second video synchronizing apparatus increases.

Note that, in the third embodiment, description has been given using the phase difference of the VSYNC signal, as an example, but the operations may be similarly performed regarding the HSYNC signal. Also, in the third embodiment, description has been given using a case where the phase difference at a time to come is predicted in the first video synchronizing apparatus, as an example. However, because the second video synchronizing apparatus retains similar pieces of information including a phase difference at a prior time, the phase difference at a time to come may be predicted in the second video synchronizing apparatus.

Figure 14:
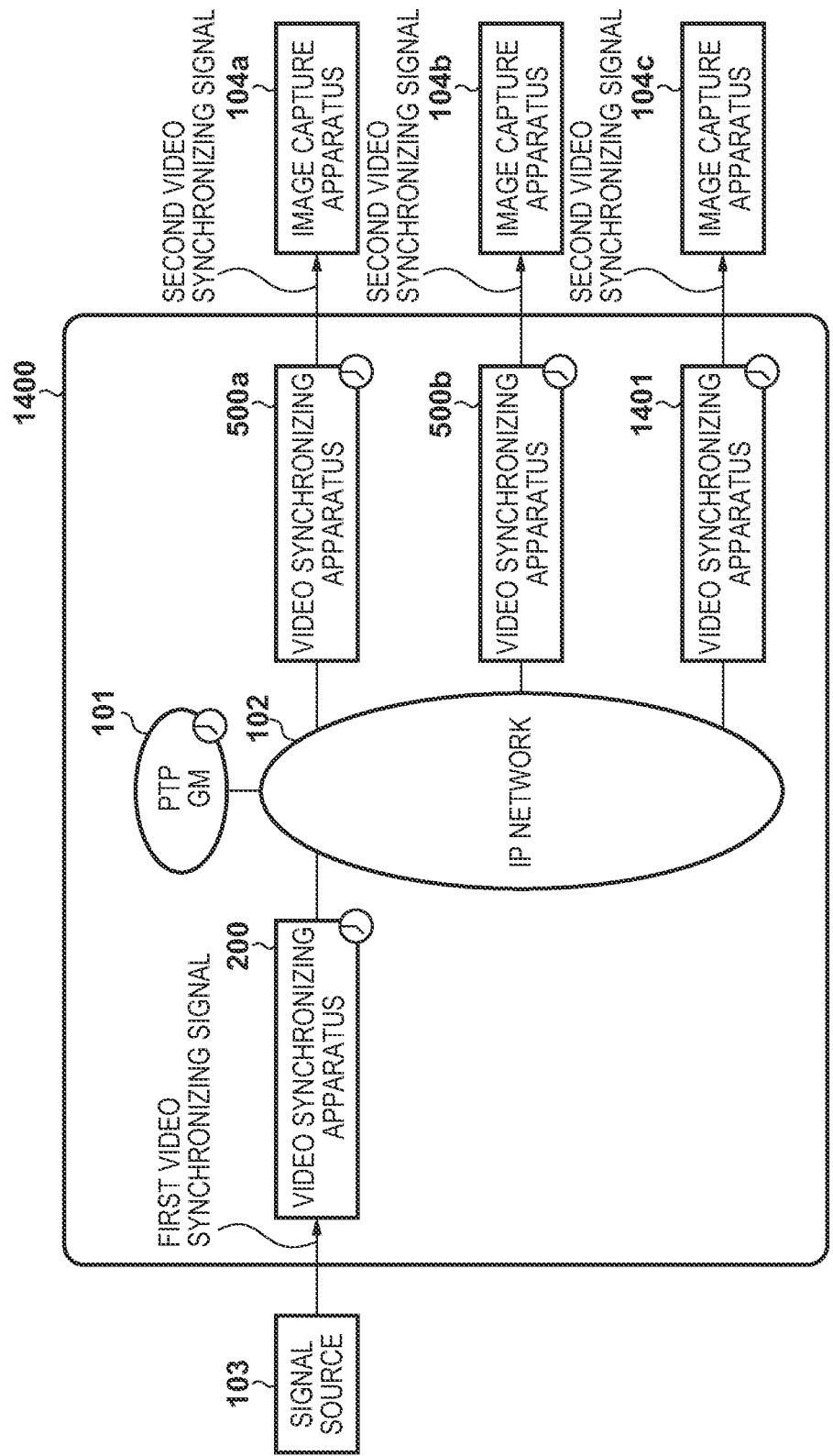
FIG. 14 is a diagram illustrating an exemplary configuration of a video synchronizing system in a fourth embodiment.

<Fourth embodiment> Next, a fourth embodiment will be described. FIG. 14 shows an exemplary configuration of a video synchronizing system 1400 in the fourth embodiment. In the video synchronizing system 1400, an image capture apparatus 104*a* and an image capture apparatus 104*b* are respectively connected to a video synchronizing apparatus 500*a* and a video synchronizing apparatus 500*b*. On the other hand, an image capture apparatus 104*c* is connected to a video synchronizing apparatus 1401 (may also be called as "third video synchronizing apparatus"), and each video synchronizing apparatus outputs a second video synchronizing signal. Note that the constituent elements that are the same as or substantially the same as those of the above described embodiments are given the same reference signs, and the description thereof is omitted.

Figure 15:
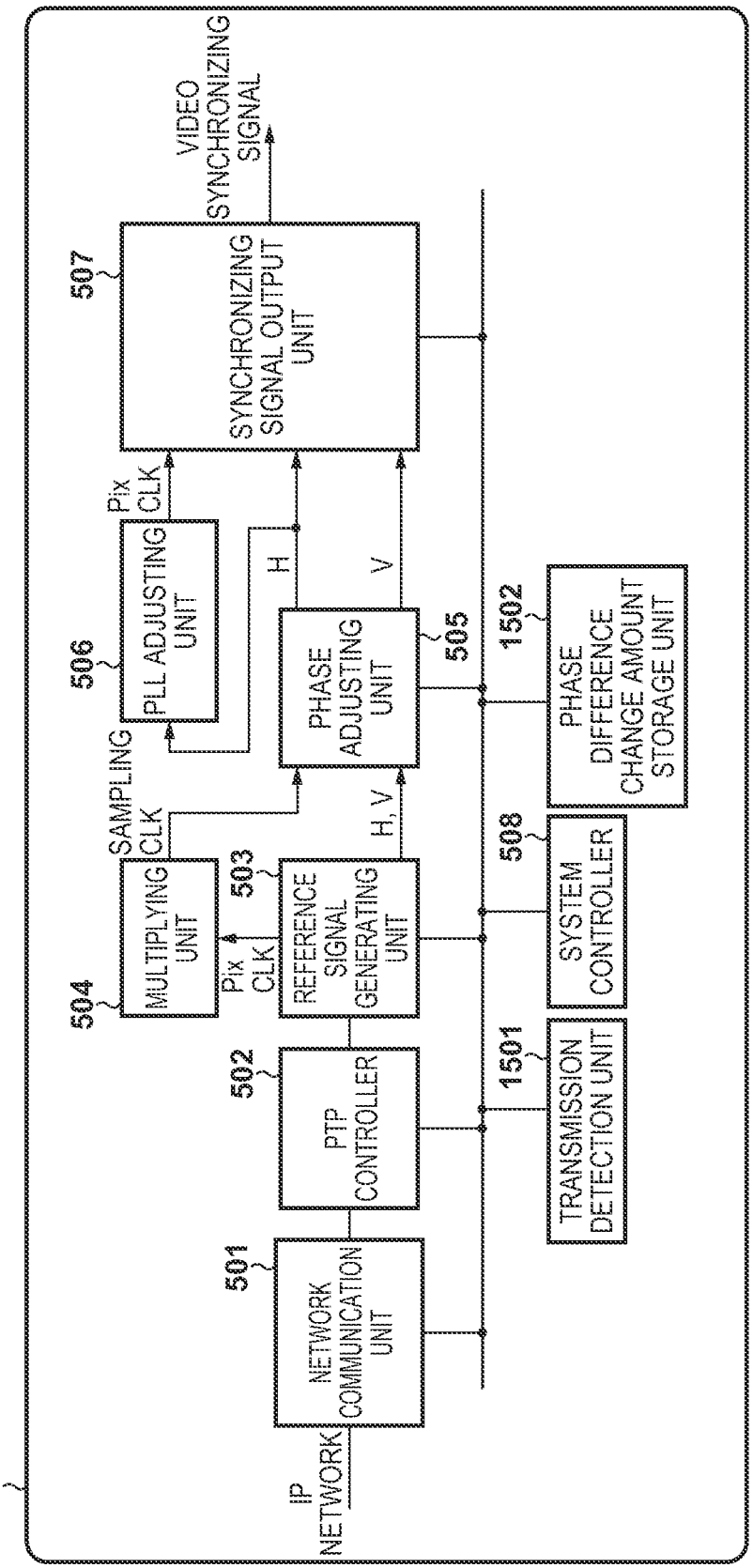
FIG. 15 is a block diagram illustrating an exemplary configuration of a third video synchronizing apparatus in the fourth embodiment.

In the following, an exemplary configuration and operations of the video synchronizing apparatus 1401 will be described. FIG. 15 shows an exemplary configuration of the video synchronizing apparatus 1401. The video synchronizing apparatus 1401 differs from the video synchronizing apparatus 500 in that a transmission detection unit 1501 and a phase difference change amount storage unit 1502 are further included.

The phase difference change amount storage unit 1502 stores a phase difference change amount per unit time, in accordance with a phase difference and information regarding a phase difference change amount that are transmitted from a network communication unit 207 in a video synchronizing apparatus 200. Note that the phase difference change amount storage unit 1502 may include a nonvolatile memory, or may control writing/reading of a phase difference change amount to/from a nonvolatile memory in the video synchronizing apparatus 1401.

The transmission detection unit 1501, upon detecting that the data transmitted from the network communication unit 207 of the video synchronizing apparatus 200 is anomalous, calculates a phase difference according to the phase difference change amount per unit time that is stored in the phase difference change amount storage unit 1502 of the video synchronizing apparatus 1401. Moreover, the transmission detection unit 1501 causes the video synchronizing apparatuses 500a and 500b to perform multicast stream transmission via a network communication unit 501 by controlling a system controller 508.

Figure 16:
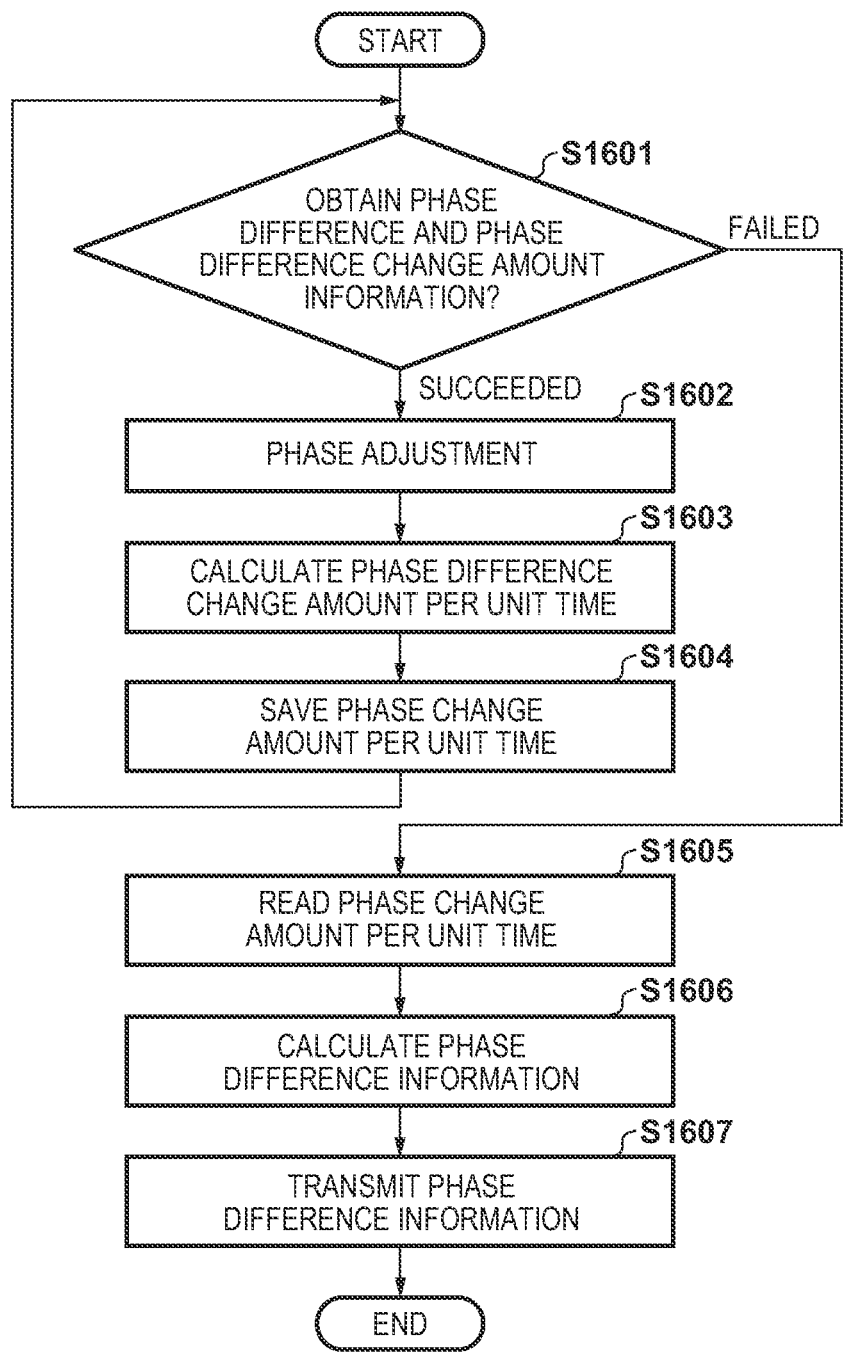
FIG. 16 is a flowchart illustrating operations to be performed when failed in acquiring phase difference and phase difference change amount information in the fourth embodiment.

Next, the operations of a transmitting process of phase difference information in the video synchronizing apparatus 1401 will be described with reference to FIG. 16. Note that this process is realized by the system controller 508 of the video synchronizing apparatus 1401 controlling the units of the video synchronizing apparatus 1401 by deploying a program stored in a nonvolatile memory to a volatile memory and executing the program, unless otherwise specified.

In step S1601, the video synchronizing apparatus 1401 acquires, together with the video synchronizing apparatuses 500a and 500b, a phase difference and phase difference change amount information that are transmitted from the video synchronizing apparatus 200. Here, the system controller 508 determines whether or not the data transmitted from the network communication unit 207 of the video synchronizing apparatus 200 is properly acquired. The system controller 508, if succeeded in acquiring data transmitted from the video synchronizing apparatus 200, advances the process to step S1602, and if failed in acquiring data, advances the process to step S1605.

In a normal state in which the data transmitted from the video synchronizing apparatus 200 can be acquired, in step S1602, the system controller 508 performs phase adjustment based on the acquired phase difference information. Moreover, in step S1603, the system controller 508 calculates a phase difference change amount per unit time based on the phase difference change amount information, and saves the calculated phase difference change amount per unit time via the phase difference change amount storage unit 1502, for example.

On the other hand, when failed in acquiring data transmitted from the video synchronizing apparatus 200 due to anomaly in communication, in step S1605, the system controller 508 reads out the phase difference change amount per unit time stored via the phase difference change amount storage unit 1502, for example. Moreover, the system controller 508 calculates, in step S1506, phase difference information corresponding to the time at which the phase difference information is to be transmitted, and transmits, in step S1607, the phase difference information to the video synchronizing apparatuses 500a and 500b. The system controller 508, upon transmitting the phase difference information, thereafter ends the process.

As described above, in the fourth embodiment, when anomaly or the like occurs in communication with the video synchronizing apparatus 200, the video synchronizing apparatus 1401 transmits phase difference information to the video synchronizing apparatuses 500a and 500b based on information regarding phase change per unit time that has been acquired and saved at a prior time. As a result, even when anomaly or the like occurs in communication with the video synchronizing apparatus 200, image distortion in video transmission can be prevented or mitigated.

<Fifth embodiment> Next, a fifth embodiment will be described. In the fourth embodiment, an example has been illustrated in which when reception cannot be properly performed in communication with the video synchronizing apparatus 200, the video synchronizing apparatus 1401 transmits phase difference information to the video synchronizing apparatus 500. When the communication is restored from the state in which communication with the video synchronizing apparatus 200 cannot be properly performed, the state is returned to a state in which the video synchronizing apparatus 200 transmits phase difference information. Here, it is possible that a phase difference occurs between the video synchronizing signal input to the video synchronizing apparatus 200 and the video synchronizing signal output from the video synchronizing apparatus 500. In such a case, if the video synchronizing apparatus 500 performs phase adjustment of the video synchronizing signal according to the phase difference information transmitted from the video synchronizing apparatus 200 while image capturing is being performed, it is conceivable that the cycle of the video synchronizing signal rapidly changes, and the image capturing is disturbed. Therefore, in the fifth embodiment, an example of the video synchronizing apparatus 500 configured to reduce the influence on image capturing even in the aforementioned case will be described.

In the following, an exemplary configuration and operations of a video synchronizing apparatus 500 in the fifth embodiment will be described. Note that the configuration of the video synchronizing apparatus 500 in the fifth embodiment is the same as the configuration shown in FIG. 5 in the first embodiment, but the operation of a phase adjusting unit 505 is different from that in the first embodiment. Therefore, the constituent elements that are the same as or substantially the same as those of the above described embodiments are given the same reference signs, and the description thereof is omitted. Also, in the fifth embodiment, the phase adjusting unit is denoted by 505, but the internal constituent elements thereof will be described later while assigning new reference numbers 1701 to 1703. In the first embodiment, an example has been illustrated in which the phase adjusting unit 505 generates the fourth HSYNC based on the third VSYNC and the third HSYNC, and the pixel clock is generated from the fourth HSYNC. On the other hand, in the fifth embodiment, an example in which the phase adjusting unit 505 generates the pixel clock using only the third VSYNC will be illustrated.

Figure 17:
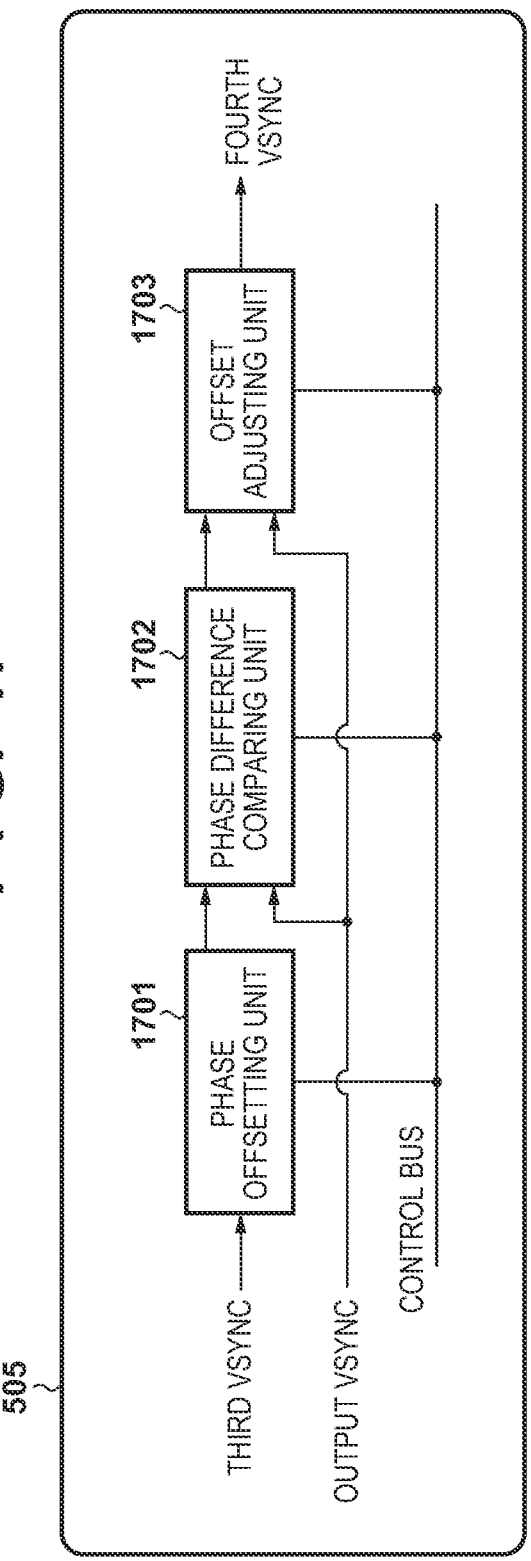
FIG. 17 is a block diagram illustrating an exemplary configuration of a phase adjusting unit in a fifth embodiment.

An exemplary configuration of the phase adjusting unit 505 in the fifth embodiment is shown in FIG. 17. The phase adjusting unit 505 in the fifth embodiment includes a phase offsetting unit 1701, a phase difference comparing unit 1702, and an offset adjusting unit 1703.

The phase offsetting unit 1701 applies an offset to the phase of the third VSYNC based on the received phase difference information, and outputs the resultant signal. The phase difference comparing unit 1702 detects the phase difference between the offset third VSYNC and an output VSYNC that is output from a synchronizing signal output unit 507. Also, the phase difference comparing unit 1702 determines whether or not the absolute value of the phase difference is equal to or less than a predetermined first threshold value, and outputs the result to the offset adjusting unit 1703. The predetermined first threshold value needs only be a value in a variation range of the video synchronizing signal in which image capturing is not disturbed (determined by experiment or the like in advance), and is a value of 40 ppm of the cycle of the video synchronizing signal, for example.

If the phase difference detected by the phase difference comparing unit 1702 is less than the predetermined first threshold value, the offset adjusting unit 1703 outputs the offset third VSYNC that is output from the phase offsetting unit 1701 to the PLL adjusting unit 506 as is, as the reference VSYNC.

On the other hand, if the phase difference detected by the phase difference comparing unit 1702 is equal to or greater than the predetermined first threshold value, the offset adjusting unit 1703 adjusts the offset amount of the offset third VSYNC in the following manner, and outputs the offset third VSYNC as a reference VSYNC.

First, the offset adjusting unit 1703 calculates a deviation in cycle that is a difference between the cycle of the third VSYNC and the cycle of the offset third VSYNC. Then, if the absolute value of the deviation in cycle is sufficiently smaller than a predetermined second threshold value, the offset adjustment value is obtained by multiplying the same sign as the deviation to the second threshold value. That is, if the cycle of the offset third VSYNC is longer than the cycle of the third VSYNC, and the deviation in cycle is a positive value, the offset adjustment value is a positive second threshold value. Conversely, if the absolute value of the deviation in cycle is large and close to the predetermined second threshold value, the offset adjustment value is obtained by multiplying a sign opposite to that of the deviation to the second threshold value. That is, if the cycle of the offset third VSYNC is longer than the cycle of the third VSYNC, and the deviation in cycle is a positive value, the offset adjustment value is a negative second threshold value. Note that the reason why the positive and negative (sign) of the offset adjustment value is controlled according to the deviation in cycle is to prevent the time until the phases match (phase difference becomes equal to or less than the first threshold value) from becoming long when the deviation in cycle is close to the second threshold value. Note that the second threshold value can be set to the same value as the first threshold value.

The operations of the process for determining the offset adjustment value in the offset adjusting unit 1703 will be described with reference to FIG. 18. The vertical axis in the diagram shows the phase difference, the horizontal axis shows the time, and the slope of a line shows the deviation in cycle, in FIG. 18. The broken line indicates the value of the received phase difference information, and the solid lines indicate the phase difference between the third VSYNC and the output VSYNC that is output from the synchronizing signal output unit 507.

Figure 18:
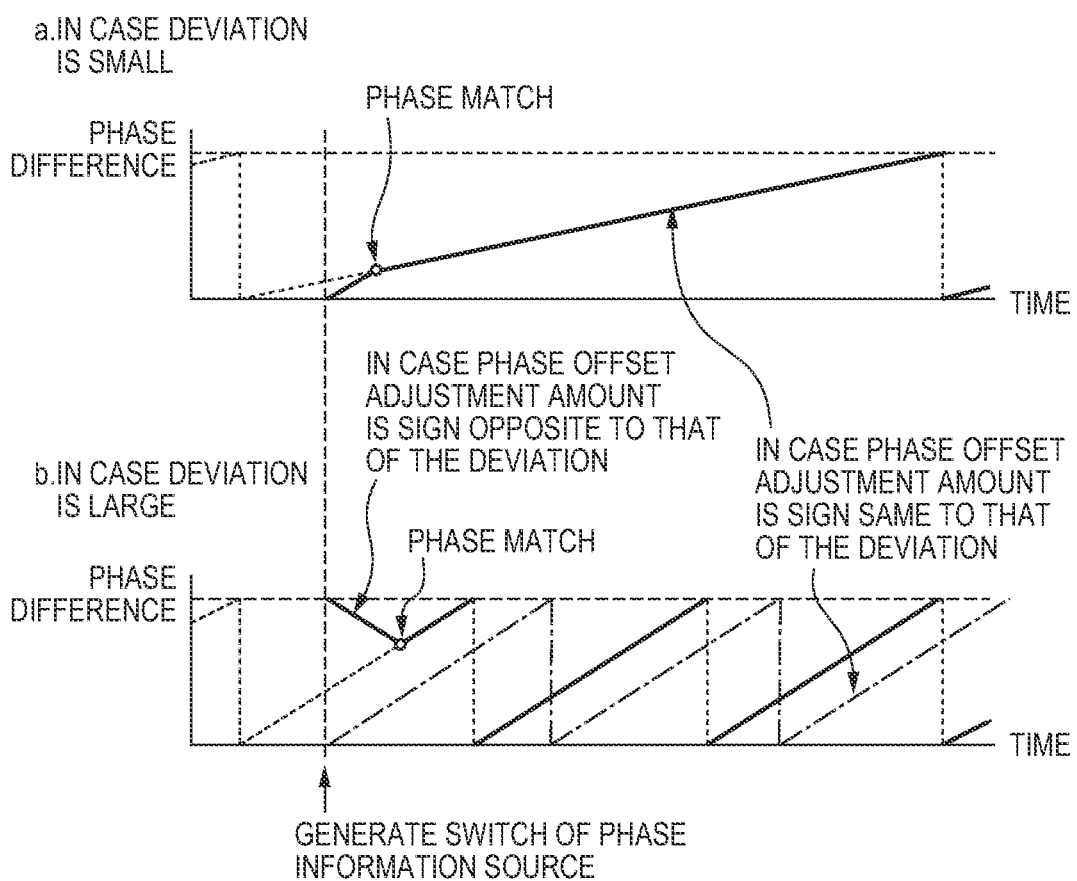
FIG. 18 is a diagram for describing a process for determining a phase offset adjustment amount in the fifth embodiment.

In FIG. 18, an example of (a) a case where the deviation in cycle that is the difference between the cycle of the third VSYNC and the cycle of the offset third VSYNC is small is illustrated. As can be understood from FIG. 18, if the deviation in cycle is small, if a phase offset adjustment amount of the same sign as the deviation in cycle is applied, the phases match in a short period of time.

In FIG. 18, an example of (b) a case where the deviation in cycle that is the difference between the cycle of the third VSYNC and the cycle of the offset third VSYNC is large is also illustrated. In this case, as shown by the one dot chain lines, it can be understood that, if a phase offset adjustment amount of the same sign as the deviation in cycle is applied, the phases do not match over a long period of time. Therefore, the offset adjusting unit 1703 of the fifth embodiment applies a phase offset adjustment amount of a sign opposite to that of the deviation in cycle, and causes the phases to match in a short period of time, as shown by the solid line.

The offset adjusting unit 1703 applies an offset to the phase of an output VSYNC that is output from the synchronizing signal output unit 507 based on the determined phase offset adjustment amount, and outputs the offset output VSYNC to the PLL adjusting unit 506 as the reference VSYNC.

Figure 19:
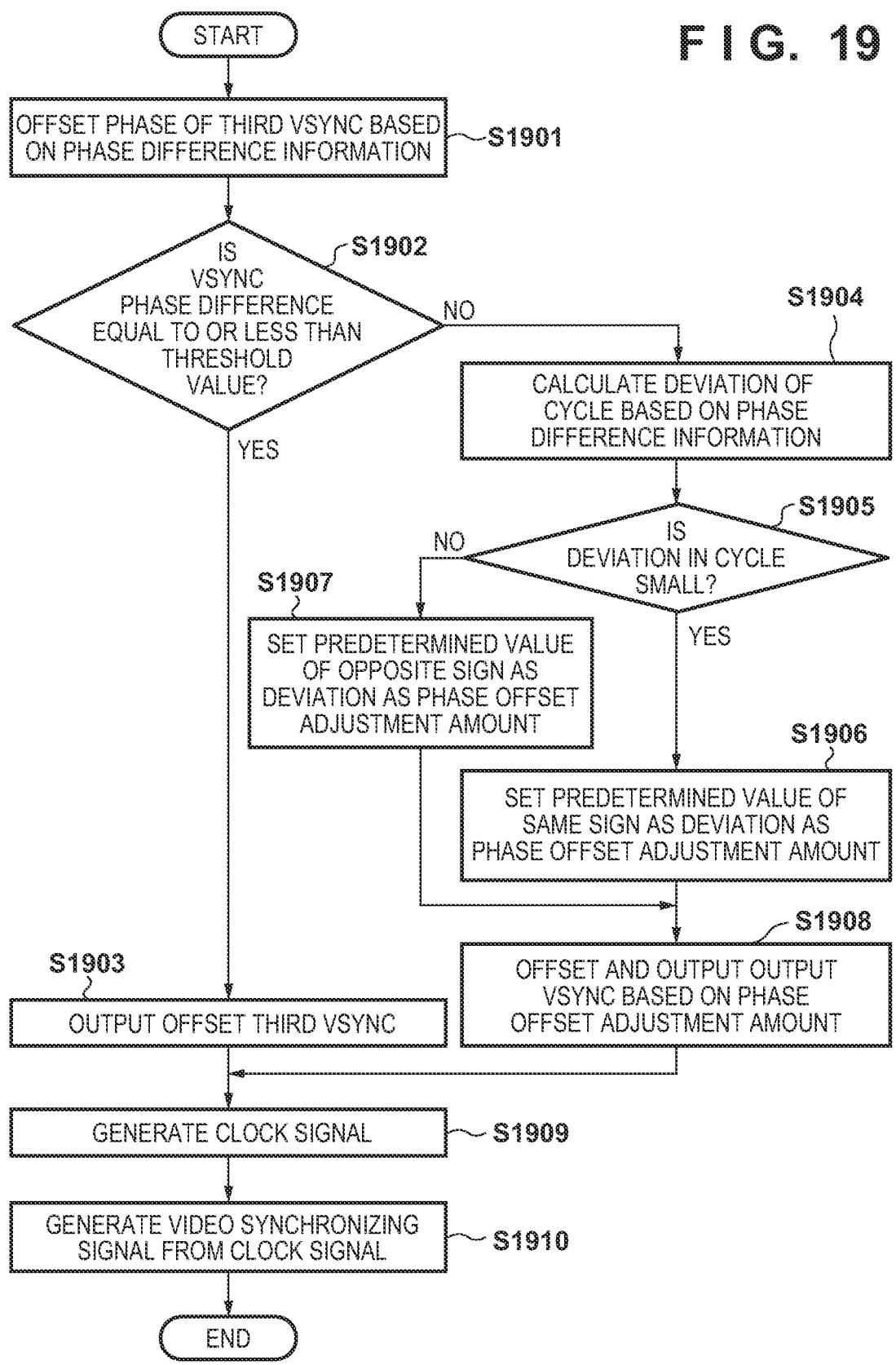
FIG. 19 is a flowchart for describing operations of a phase adjusting process in the fifth embodiment.

Next, a series of operations of phase adjustment in the video synchronizing apparatus 500 of the fifth embodiment will be described with reference to FIG. 19. Note that this process is realized by the system controller 508 of the video synchronizing apparatus 500 controlling the units of the video synchronizing apparatus 500 by deploying a program stored in a nonvolatile memory to a volatile memory and executing the program, unless otherwise specified. Note that the operations performed by the phase adjusting unit 505, the PLL adjusting unit 506, and the synchronizing signal output unit 507 may be realized by hardware for configuring each unit, or may be realized by executing a program.

In step S1901, the phase offsetting unit 1701 applies an offset to the phase of the third VSYNC based on the received phase difference information, and outputs the offset third VSYNC.

In step S1902, the phase difference comparing unit 1702 detects the phase difference between the offset third VSYNC and an output VSYNC that is output from the synchronizing signal output unit 507, and determines whether or not the absolute value of the phase difference is equal to or less than the predetermined first threshold value. The phase difference comparing unit 1702, if it is determined that the absolute value of the phase difference is equal to or less than the predetermined first threshold value, advances the process to step S1903, and if it is determined that the absolute value of the phase difference is not equal to or less than the predetermined first threshold value, advances the process to step S1904.

In step S1903, the offset adjusting unit 1703 outputs the offset third VSYNC to the PLL adjusting unit 506 as the reference VSYNC. In step S1904, the offset adjusting unit 1703 calculates the deviation in cycle that is the difference between the cycle of the third VSYNC and the cycle of the offset third VSYNC.

In step S1905, the offset adjusting unit 1703 compares the absolute value of the deviation in cycle with the predetermined second threshold value. The offset adjusting unit 1703, if the absolute value of the deviation in cycle is sufficiently small (equal to or less than a predetermined threshold value of the cycle), advances the process to step S1906, and if the absolute value of the deviation in cycle is not sufficiently small (larger than the predetermined threshold value of the cycle), advances the process to step S1907.

In step S1906, the offset adjusting unit 1703 multiplies the same sign as the deviation to the second threshold value, and set the resultant value as the phase offset adjustment amount. On the other hand, in step S1907, the offset adjusting unit 1703 multiplies the sign opposite to that of the deviation to the second threshold value, and set the resultant value as the phase offset adjustment amount.

In step S1908, the offset adjusting unit 1703 applies an offset to the phase of VSYNC that is output from a synchronizing signal generating unit based on the set phase offset adjustment amount, and output the offset VSYNC as a PLL reference synchronizing signal.

In step S1909, the PLL adjusting unit 506 generates a clock signal based on the PLL reference synchronizing signal and VSYNC output from the synchronizing signal generating unit. In step S1910, the synchronizing signal output unit 507 generates a video synchronizing signal from the clock signal, and outputs the video synchronizing signal. Thereafter, the system controller 508 ends this process.

Note that, in the fifth embodiment, an example has been shown in which, in the phase difference comparing unit 1702, when the absolute value of the phase difference exceeds the predetermined first threshold value, the phase difference adjustment is restricted, and as a result, the change in the video synchronizing signal to be output is suppressed. However, if a configuration is adopted in which the case of not performing image capturing and the case where the change in the video synchronizing signal is tolerable are further determined, and if these cases are determined, the phase difference adjustment is not restricted, the time until the phases match can be reduced.

As described above, in the fifth embodiment, if the phase difference between the received phase difference information and the output VSYNC that is output from the synchronizing signal output unit 507 is larger than a predetermined threshold value in such a case where the apparatus that transmits the phase difference information is switched, the offset adjustment amount is restricted. Therefore, the change in cycle of the video synchronizing signal output from the synchronizing signal output unit is suppressed to a predetermined range, and influence on image capturing can be suppressed even when image capturing is being performed. Also, the sign of the phase offset adjustment amount is determined based on the difference between the cycle of the third VSYNC and the cycle of the offset third VSYNC. As a result, the time until the phases match (phase difference becomes equal to or less than the first threshold value) can be prevented from increasing when the deviation in cycle is close to the second threshold value.

<Sixth embodiment> A program code itself to be supplied and installed in a computer in order to realize the above described embodiments by the computer is for realizing one embodiment of the disclosure. That is, the computer program itself for realizing the above described embodiments is included in the embodiments of the disclosure. In this case, as long as the functions of a program are realized, any configuration of a program is possible, such as an object code, a program that is executed by an interpreter, or script data that is supplied to an OS. A recording medium for supplying the program may be, for example, a hard disk, a magnetic recording medium such as magnetic tape, an optical/magneto-optical storage medium, or a nonvolatile semiconductor memory. Conceivable methods of supplying the program include a computer program for forming the above described embodiments being stored in a server on a computer network, and a client computer connected to the computer network downloading and performing programming.

<Seventh embodiment> At least one of the various functions, processes and methods that have been described in the above described embodiments can be realized by using a program. In the following, in a seventh embodiment, the program for realizing at least one of the various functions, processes and methods that have been described in the above described embodiments is called as "program X". Moreover, in the seventh embodiment, a computer for executing the program X is called as "computer Y". A personal computer, a microcomputer, a CPU (Central Processing Unit), or the like is an example of the computer Y.

At least one of the various functions, processes and methods that have been described in the above described embodiments can be realized by the computer Y executing the program X. In this case, the program X is supplied to the computer Y via a computer-readable storage medium. The computer-readable storage medium in the seventh embodiment includes at least one of a hard disk device, a magnetic storage device, an optical storage device, a magneto-optical storage device, a memory card, a ROM, a RAM, or the like. Moreover, the computer-readable storage medium in the seventh embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all such modifications and equivalent structures.

This application claims the benefit of Japanese Patent Application No. 2020-094911, filed May 29, 2020, which is hereby incorporated by reference herein in its entirety.

What is claimed is:

1. An apparatus comprising:
 a generating unit that (i) generates synchronization format information regarding a vertical synchronizing frequency and a horizontal synchronizing frequency of a first video synchronizing signal, and (ii) generates phase difference information indicating a phase difference between the first video synchronizing signal and a first reference signal synchronized with a grand master clock; and
 a transmitting unit that transmits the synchronization format information and the phase difference information to an external apparatus that can generates a second video synchronizing signal synchronized with the first video synchronizing signal.

2. The apparatus according to claim 1, wherein the generating unit generates the phase difference information using a sampling clock obtained by multiplying a clock of the first reference signal.

3. The apparatus according to claim 1, wherein the phase difference includes at least one of a phase difference between a vertical synchronizing signal of the first video synchronizing signal and a vertical synchronizing signal of the first reference signal and a phase difference between a horizontal synchronizing signal of the first video synchronizing signal and a horizontal synchronizing signal of the first reference signal.

4. The apparatus according to claim 1, wherein the number of packets to be transmitted is changed according to whether or not a change in the phase difference in a case the phase difference information is repeatedly generated is inside a predetermined range.

5. The apparatus according to claim 1, wherein the generating unit predicts a phase difference at a time to come based on the phase difference information generated at a prior time, and generates phase difference information including the phase difference at a time to come.

6. The apparatus according to claim 1, wherein the grand master clock conforms to SMPTE ST-2059.

7. An apparatus comprising:
 a receiving unit that receives (i) synchronization format information regarding a vertical synchronizing frequency and a horizontal synchronizing frequency of a first video synchronizing signal and (ii) phase difference information indicating a phase difference between the first video synchronizing signal and a first reference signal synchronized with a grand master clock; and
 a generating unit that generates a second video synchronizing signal that synchronizes with the first video synchronizing signal, based on the synchronization format information, the phase difference, and a second reference signal synchronized with the grand master clock.

8. The apparatus according to claim 7, wherein the generating unit generates the second video synchronizing signal using a sampling clock obtained by multiplying a clock of the second reference signal.

9. The apparatus according to claim 7, wherein the phase difference includes at least one of a phase difference between a vertical synchronizing signal of the first video synchronizing signal and a vertical synchronizing signal of the first reference signal and a phase difference between a horizontal synchronizing signal of the first video synchronizing signal and a horizontal synchronizing signal of the first reference signal.

10. The apparatus according to claim 7, wherein the phase difference information includes a predicted phase difference at a time to come, and
the generating unit generates the second video synchronizing signal to which a phase offset is applied using the predicted phase difference at a time to come.

11. The apparatus according to claim 7, wherein the generating unit changes a phase offset amount based on the phase difference according to whether or not a phase difference between a phase of a signal in a case a phase offset is applied based on the phase difference and a phase of the second video synchronizing signal is equal to or greater than a predetermined first threshold value.

12. The apparatus according to claim 11, wherein the generating unit changes positive and negative of the phase offset amount based on the phase difference according to an absolute value of a deviation between a cycle of a signal in a case a phase offset based on the phase difference is applied and a cycle of the second video synchronizing signal.

13. The apparatus according to claim 7, wherein the grand master clock conforms to SMPTE ST-2059.

14. A method comprising:
generating synchronization format information regarding a vertical synchronizing frequency and a horizontal synchronizing frequency of a first video synchronizing signal;
generating phase difference information indicating a phase difference between the first video synchronizing signal and a first reference signal synchronized with a grand master clock; and
transmitting the synchronization format information and the phase difference information to an external apparatus that can generates a second video synchronizing signal synchronized with the first video synchronizing signal.

15. A method comprising:
receiving (i) synchronization format information regarding a vertical synchronizing frequency and a horizontal synchronizing frequency of a first video synchronizing signal and (ii) phase difference information indicating a phase difference between the first video synchronizing signal and a first reference signal synchronized with a grand master clock; and
generating a second video synchronizing signal that synchronizes with the first video synchronizing signal, based on the synchronization format information, the phase difference, and a second reference signal synchronized with the grand master clock.

* * * * *